(12) United States Patent
Jaeger

(10) Patent No.: US 10,789,314 B2
(45) Date of Patent: Sep. 29, 2020

(54) ENHANCED VIEWER-DIRECTED MOTION PICTURE SCREENING INCORPORATING A MOBILE SCREENING VENUE

(71) Applicant: CineMob, Inc., New York, NY (US)

(72) Inventor: Jacob Jaeger, New York, NY (US)

(73) Assignee: CINEMOB, INC., New York, NY (US)

( * ) Notice: Subject to any disclaimer, the term of this patent is extended or adjusted under 35 U.S.C. 154(b) by 182 days.

(21) Appl. No.: 15/869,647

(22) Filed: Jan. 12, 2018

(65) Prior Publication Data

US 2018/0137205 A1 May 17, 2018

Related U.S. Application Data

(63) Continuation-in-part of application No. 15/442,141, filed on Feb. 24, 2017, which is a continuation-in-part of application No. 15/133,839, filed on Apr. 20, 2016.

(51) Int. Cl.
G06Q 10/00 (2012.01)
G06F 16/9535 (2019.01)
G06F 3/0482 (2013.01)
G06F 3/0484 (2013.01)
G06F 3/0488 (2013.01)
(Continued)

(52) U.S. Cl.
CPC ........ *G06F 16/9535* (2019.01); *G06F 3/0482* (2013.01); *G06F 3/04842* (2013.01); *G06F 3/04883* (2013.01); *G06K 19/06037* (2013.01); *G06Q 10/02* (2013.01); *G06Q 10/101* (2013.01);
(Continued)

(58) Field of Classification Search
None
See application file for complete search history.

(56) References Cited

U.S. PATENT DOCUMENTS 9,100,629 B1 * 8/2015 Brenden ................. A63F 13/86
2004/0102197 A1 * 5/2004 Dietz ................. G06Q 30/0261
455/456.1
(Continued)

OTHER PUBLICATIONS

Archived Tugg FAQ web site retrieved from the Internet [URL: https://web.archive.org/web/20141121094513/http://resources.tugg.com/faq], archived on Nov. 21, 2014.*
(Continued)

*Primary Examiner* — Susanna M. Diaz
(74) *Attorney, Agent, or Firm* — Hoffmann & Baron, LLP

(57) ABSTRACT

A method for facilitating a viewer-directed motion picture screening event includes: enrolling viewers and at least one motion picture screening facility in a viewer-directed motion picture screening service; sending a request for screening a given motion picture, initiated by at least one of the viewers; receiving, by the at least one viewer, notification regarding a status of the request; when the request has been granted, determining whether the motion picture screening facility is located within a prescribed distance of a subset of viewers who have indicated an intent to screen the given motion picture; dispatching a mobile motion picture screening unit to a given location that is within the prescribed distance of the subset of viewers when the motion picture screening facility is located outside the prescribed distance; and sending information to the subset of viewers indicating at least a date, time and/or location of the motion picture screening event.

17 Claims, 16 Drawing Sheets

(51) Int. Cl.
G06Q 10/02 (2012.01)
G06K 19/06 (2006.01)
G06Q 10/10 (2012.01)
G06Q 30/02 (2012.01)
G06Q 50/00 (2012.01)

(52) U.S. Cl.
CPC ..... G06Q 30/0217 (2013.01); G06Q 30/0241 (2013.01); *G06Q 50/01* (2013.01)

(56) References Cited

U.S. PATENT DOCUMENTS

| | | | | |
|---|---|---|---|---|
| 2004/0158865 | A1* | 8/2004 | Kubler | G06Q 30/02 |
| | | | | 725/82 |
| 2006/0010037 | A1* | 1/2006 | Angert | G06Q 10/087 |
| | | | | 705/15 |
| 2008/0086512 | A1* | 4/2008 | Fahys | G06Q 10/06 |
| 2012/0158545 | A1* | 6/2012 | Chen | G06Q 30/0623 |
| | | | | 705/26.61 |
| 2013/0197949 | A1* | 8/2013 | Dermer | G06Q 10/02 |
| | | | | 705/5 |
| 2013/0304525 | A1* | 11/2013 | Skaggs | G06Q 10/02 |
| | | | | 705/5 |
| 2014/0033243 | A1* | 1/2014 | Chen | H04N 21/252 |
| | | | | 725/23 |
| 2014/0214504 | A1* | 7/2014 | Young | G06Q 10/109 |
| | | | | 705/14.5 |
| 2014/0330739 | A1* | 11/2014 | Falcone | G06Q 10/08355 |
| | | | | 705/338 |
| 2015/0088779 | A1* | 3/2015 | Falcone | G06Q 10/083 |
| | | | | 705/330 |
| 2015/0120364 | A1* | 4/2015 | Deshpande | G06Q 10/06312 |
| | | | | 705/7.22 |
| 2015/0348121 | A1* | 12/2015 | Lee | G06Q 30/0269 |
| | | | | 705/5 |
| 2015/0365582 | A1* | 12/2015 | Eramian | H04N 5/23206 |
| | | | | 348/159 |
| 2016/0148122 | A1 | 5/2016 | Paleja et al. | |
| 2016/0148123 | A1* | 5/2016 | Paleja | G06Q 10/02 |
| | | | | 705/5 |
| 2016/0148124 | A1 | 5/2016 | Paleja et al. | |
| 2016/0148125 | A1 | 5/2016 | Paleja et al. | |
| 2016/0148126 | A1 | 5/2016 | Paleja et al. | |
| 2017/0262784 | A1* | 9/2017 | Lowery | G06Q 10/063114 |
| 2019/0050873 | A1* | 2/2019 | Henderson | G06Q 30/0201 |

OTHER PUBLICATIONS

Klein, Gary. "What's the Alternative?" Box Office, pp. 10-11, Oct. 2012.*
Edennariann,Aida."Review:Movie Pictures:The problem:the people of the highlands and islands—an area the size of Belgium—have only eight cinemas.The solution:a mobile film house that negotiates single-track roads, peat bogs and stormy waters to take films to the most far-flung parts of Britain." The Guardian, Apr. 18, 2003.*
Livingston, Robert. "A Problem for All the Independent Cinemas." The Herald, Nov. 14, 2002.*
Aftab, Kaleem. "Due North." The Independent, Jul. 23, 2008.*
Vass, Steven. "The Multiplex Backlash." Sunday Herald, Sep. 2, 2012.*
"Theatrical on Demand," Gathr Support Center, Gathr Films, LLC, printed Aug. 26, 2016, pp. 1-2.
Jeremy Hsu, "Can Movie Screenings on Demand Save Hollywood?" TechNewsDaily, Jan. 10, 2013, pp. 1-3.
"How Tugg Works," Tugg School, Tugg, Inc., http://resources.tugg.com/howtuggworks/, 2014, p. 1.
"Screen Machine," Wikipedia, Jul. 2017, pp. 1-2.
"The Screen Machine: A reel adventure," The Scotsman, Johnston Publishing Ltd., Apr. 2009, pp. 1-5.

* cited by examiner

ENHANCED VIEWER-DIRECTED MOTION PICTURE SCREENING INCORPORATING A MOBILE SCREENING VENUE

CROSS-REFERENCE TO RELATED APPLICATION(S)

This application is a continuation-in-part of U.S. application Ser. No. 15/442,141 filed Feb. 24, 2017, which in turn is a continuation-in-part of U.S. application Ser. No. 15/133,839 filed Apr. 20, 2016, the complete disclosures of which are expressly incorporated herein by reference in their entireties for all purposes.

FIELD

The present invention relates generally to motion picture distribution and screening, and more particularly relates to viewer-directed motion picture screening.

BACKGROUND

Despite the changing ways in which motion pictures are distributed (e.g., digital versatile discs (DVDs), on-demand, etc.) and advances in home theater electronics (e.g., high-definition television (HDTV), Blu-ray, surround sound audio equipment, etc.), the theatrical experience remains one of the most captivating ways for audiences to enjoy a film. Seeing a movie on a big screen with immersive sound and an enthusiastic audience provides the viewer with palpable thrills. This enhanced experience is perhaps a primary reason why big screen movies continue to thrive. Although filmed content can now be consumed anywhere, on any schedule, the continued steady growth of box office ticket sales worldwide reveals that audiences of all ages still crave the shared communal experience of seeing a film in a theater surrounded by an animated crowd. In short, audiences remain committed to the theater experience.

SUMMARY

One or more embodiments of the present invention provide a motion picture viewer with the ability to initiate the screening of a desired movie or movies in a mobile theatrical environment (e.g., a mobile theater) with an audience of similarly-situated viewers, and to direct the choice of movie titles, locations and/or show times. In this manner, aspects according to embodiments of the invention essentially create a motion picture screening event by leveraging a "flash mob," also referred to herein as a "smart mob," for the specific purpose of screening a desired movie. The present invention, in one or more embodiments, will facilitate the creation of private film screenings curated and marketed by a system and methodology according to embodiments of the invention utilizing, for example, social media and/or alternative communication means to create viral flash mobs to populate private movie screenings, thereby creating a new film distribution paradigm for releasing and screening movies; namely, theatrical movie screenings on-demand.

One or more embodiments of the present invention provide a viewer with the ability to initiate and direct the curation of an audience of similarly-situated viewers for the purpose of screening a movie chosen by the viewer at a mobile motion picture screening venue (e.g., mobile movie theater, etc.). In this manner, aspects according to embodiments of the invention effectively curate and direct a "flash mob" for the specific purpose of screening a desired movie at any location which is accessible by a vehicle; in essence, creating a viewer-directed, on-demand mobile movie theater.

In accordance with one embodiment, a method for facilitating a viewer-directed motion picture screening event includes the steps of: enrolling a plurality of viewers and at least one motion picture screening facility in a viewer-directed motion picture screening service, via a management module executing on at least one hardware processor; sending a request for screening a given motion picture, initiated by at least one of the plurality of viewers, to the management module; receiving, by the at least one viewer, notification from the management module regarding a status of the request for screening the given motion picture; when the notification from the management module indicates that the request for screening the given motion picture has been granted, determining whether the at least one motion picture screening facility is located within a prescribed distance of a subset of the plurality of viewers who have indicated an intent to screen the given motion picture; dispatching a mobile motion picture screening unit to a given location that is within the prescribed distance of said subset of the plurality of viewers when the at least one motion picture screening facility is located outside the prescribed distance; and sending information by the management module to said subset of the plurality of viewers indicating at least one of a date, time and location of the viewer-directed motion picture screening event established for viewing the given motion picture.

In accordance with another embodiment, an apparatus for facilitating a viewer-directed motion picture screening event includes a memory, at least one processor coupled with the memory, and a management module executing on the processor. The management module is configured: to enroll a plurality of viewers and at least one motion picture screening facility in a viewer-directed motion picture screening service; to receive a request for screening a given motion picture from at least one of the plurality of viewers; to send a notification to the at least one viewer regarding a status of the request for screening the given motion picture; when the notification indicates that the request for screening the given motion picture has been granted, to determine whether the at least one motion picture screening facility is located within a prescribed distance of a subset of the plurality of viewers who have indicated an intent to screen the given motion picture; to dispatch a mobile motion picture screening unit to a given location that is within the prescribed distance of said subset of the plurality of viewers when the at least one motion picture screening facility is located outside the prescribed distance; and to send information to said subset of the plurality of viewers indicating a date, time and/or location of the viewer-directed motion picture screening event established for viewing the given motion picture.

Techniques according to embodiments of the present invention provide substantial beneficial technical effects. By way of example only and without limitation, one or more embodiments provide techniques for implementing a viewer-directed screening of a movie, referred to herein as CineMob, which include one or more of the following advantages, among other benefits:

facilitates the curation and/or organization of audiences, referred to herein as "mobs" or "smart mobs," for the purpose of screening motion pictures on their own schedule in their neighborhood theaters or other private screening facilities (e.g., auditoriums, etc.), thereby offering audiences a more controlled and satisfying experience of going to the movies achieves additional or extended theatrical returns without standard marketing and exhibition costs incurred by a motion picture in an active commercial release; CineMob essentially operates as a clearinghouse designed to expand theatrical exposure following the regular "first run" of a film.

rewards theaters by creating an active marketplace for their unused seats which, as an incentive for their flexibility, effectively generates increased ticket sales. Moreover, local merchants gain access to individually known customers identified by their interests, and CineMob provides an ideally targeted niche advertising.

rewards distributors by prolonging theatrical exposure of a film, thus improving the box office performance of the film in other distribution venues and/or formats, such as digital streaming and DVD. Filmmakers will see increased royalties due, at least in part, to the extended theatrical exposure.

advantageously combines the CineMob audience curation platform for generating viewer-directed motion picture screening events with a mobile motion picture screening venue for establishing on-demand, viewer-directed private movie screenings in locations where fixed-address (i.e., "brick and mortar") theaters generally do not exist, such as rural communities, college campuses, and the like.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
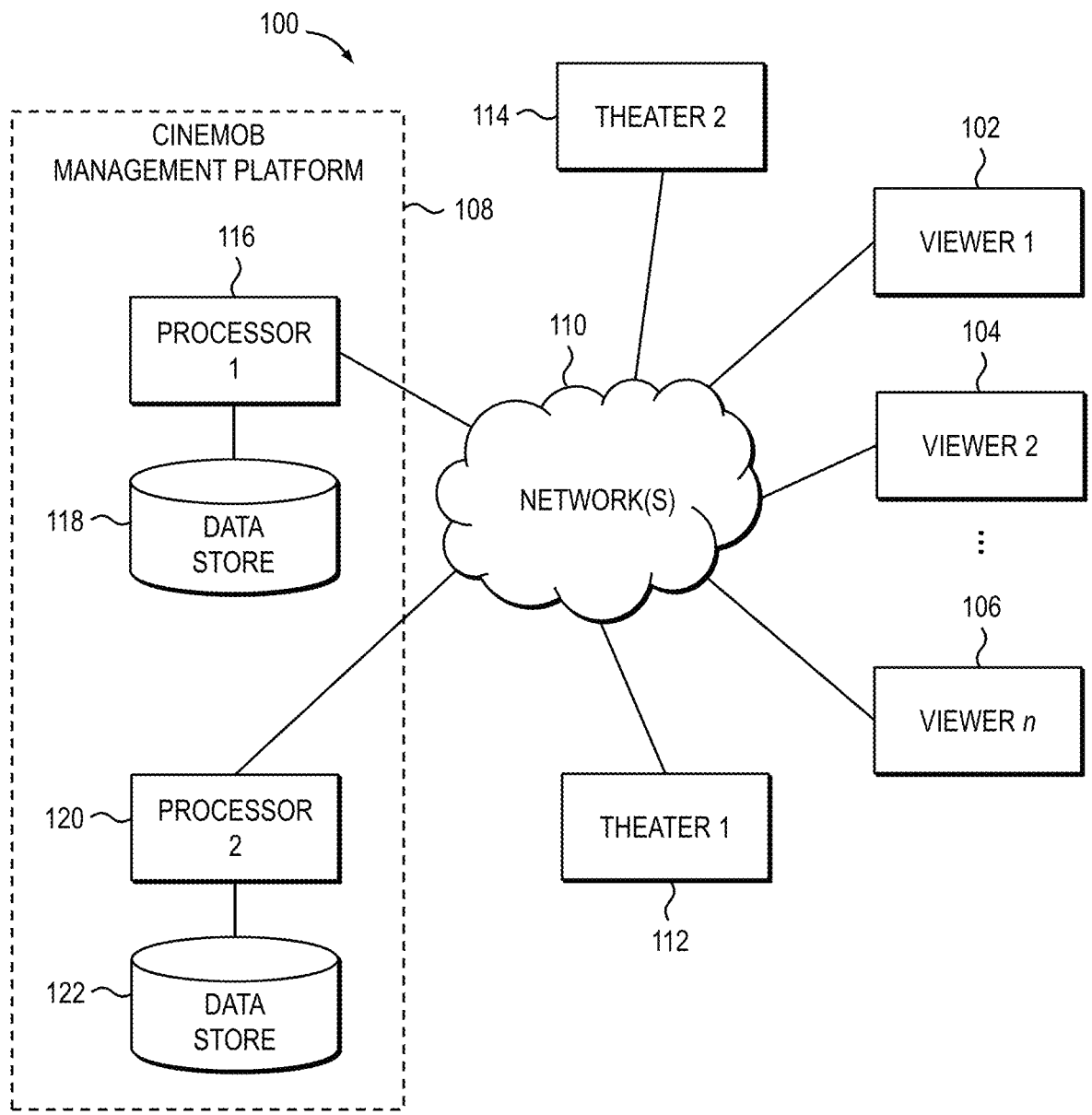
FIG. 1 is a block diagram depicting at least a portion of a user-directed motion picture screening system, according to an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of an illustrative methodology, apparatus and system for providing viewers with a mechanism for scheduling an exclusive screening of a desired motion picture by creating an audience of similarly-interested viewers using a social media network or similar communication means and establishing a viewer-directed, on-demand movie screening at essentially any location that is accessible by a vehicle. It is to be appreciated, however, that the invention is not limited to the specific methods and/or apparatus illustratively shown and described herein. Rather, aspects of the present disclosure are directed more broadly to techniques for facilitating a user-directed shared motion picture screening experience. Moreover, it will become apparent to those skilled in the art given the teachings herein that numerous modifications can be made to the embodiments shown that are within the scope of the claimed invention. That is, embodiments of the invention shown and described herein are merely illustrative, and no limitations with respect to these embodiments are intended or should be inferred.

As an initial matter, the terms "film," "featured film," "movie," "motion picture," and the like, are considered to be synonymous with one another and may therefore be used interchangeably herein. These terms, in the general sense, refer broadly to a series of still images which, when shown on a screen (e.g., theater screen) or similar viewing surface, create an illusion of moving images due to the phi phenomenon and persistence of vision, as will be well-known by those skilled in the art. This optical illusion causes the viewer to perceive continuous motion between separate objects observed rapidly in succession.

In cinema parlance, a film in its "first run" generally refers to a movie that has been recently released. New movies attract a majority of their theatrical viewers in the first few weeks after their release, after which interest in the movie often subsides. The first run theatrical launch of a motion picture therefore represents one of the most critical, expensive and risk-laden phases in a movie's release by which its future marketing lifespan and value are determined. A predominant share of the marketing budget for a given motion picture is spent during film production, launch and theatrical run. The opening box office ticket sales (i.e., "numbers"), the critical media response and the initial "word of mouth" crucially and indelibly affect subsequent secondary release windows. The length of time that passes after a movie is released affects the rate that theaters pay to show or screen the movie; this rate generally decreases with increasing time after the initial movie release.

Additionally, keeping a movie running in a theatrical marketplace is prohibitively expensive; a theater must often end first run films prematurely simply due to a lack of tickets being sold to fill a predetermined minimum number of screenings per week, thereby stranding an otherwise willing and paying audience. More particularly, there is a point of diminishing returns in the life of every movie, at which point a distributor will elect to close the movie. An antiquated distribution and inflexible scheduling practice—more than ninety years old—results in exhibitors actually filling only about half of their overall seating capacity. Few other products or services place such rigid constraints on the very customers they work so hard to attract.

Busy schedules often make it challenging for a viewer to see a movie during its short theatrical first run. Statistically, nearly two thirds of viewers who desire to see a movie in a theater do not get a chance to do so before the movie closes in the theaters. These viewers must then wait several months for the movie to become available on cable, DVD or some other media, or simply forego the movie entirely. But even having the availability of watching the movie at home does not achieve the same experience for a viewer as screening the movie in a theater with an audience.

In order to address one or more of the above-noted shortcomings of a conventional movie screening paradigm, aspects of the present invention beneficially provide viewers with a collaborative means for creating their own private movie screening experience. In essence, one or more embodiments of the invention creates a "flash mob" (defined broadly as a group of people who assemble suddenly in a public place, perform a common act for a brief time, and then disperse), referred to herein as a "CineMob," for the specific purpose of screening a desired film, thereby effectively creating an on-demand "virtual theater."

Many modern forms of revolutionary change are driven by social networking. The viral phenomenon was propelled worldwide by flash mobs which were driven by local people and their needs. Embodiments of the invention beneficially leverage the concept of a flash mob to create what may be referred to herein as a "smart mob" which can be more consciously and deliberately directed by the viewer for the specific purpose of creating a viewer-controlled movie screening experience. Aspects of the present disclosure take advantage of the fact that once a motion picture completes its first run, a significant potential audience remains that wishes to experience a select movie in a theatrical environment (e.g., a movie theater).

The relevance and currency of a movie that was brand-marketed by a professional theatrical releasing outfit stays current in the public conscious for weeks after the completion of the initial launch. Therefore, by providing additional screening opportunities for this potential audience at essentially no additional marketing cost, one or more embodiments of the invention spawn a distinct efficiency that will benefit distributors and exhibitors. This efficiency will be achieved, according to embodiments of the invention, by integrating a prevailing customer need with the capabilities and infrastructure associated with a traditional theater experience, such as, for example, empty theater seats, available prints and digitals, pre-existing advertising and promotional campaign elements, among other components.

By way of example only and without limitation or loss of generality, an illustrative user-directed motion picture screening service according to one or more aspects of the disclosure will be described in conjunction with FIG. 1. Specifically, FIG. 1 is a block diagram depicting at least a portion of a user-directed motion picture screening system 100, according to an embodiment of the invention. The system 100 includes a plurality of viewers, viewer 1 102, viewer 2 104, through viewer n 106 (where n is an integer greater than 1), in operative communication with a CineMob management module or platform 108 through at least one communications network 110. At least a portion of the viewers 102, 104, 106, in one or more embodiments, are paid subscribers to the CineMob service. The system 100 further includes one or more movie screening facilities (e.g., movie theaters, auditoriums, etc.), 112 and 114, or alternative screening sites (e.g., outdoor stages, parks, etc.), in operative communication with the management platform 108 through the communications network 110. The movie screening facilities 112, 114 provide physical sites for hosting movies through the CineMob service.

Multiple levels of subscriptions to the CineMob service may be provided which enable viewers to tailor their expenses commensurate with their expected movie viewing habits. For instance, a user may opt to pay a flat monthly fee which entitles the user to a prescribed number of movie screenings per month; the number of included movie screenings per month will increase with more costly monthly subscription packages, with a "gold" package offering unlimited movie screenings per month, according to one or more embodiments. In alternative embodiments, one or more viewers 102, 104, 106 may opt for a pay-per-use arrangement, wherein the user pays a basic monthly fee for enrollment in the CineMob service and is then additionally charged for each movie screening. In one or more embodiments, once a user has reached the maximum number of movie screenings available in his or her subscription package for any given time period, the CineMob service may default to a pay-per-use fee schedule for additional movie screenings.

In FIG. 1, each of the viewers 102, 104, 106, utilizes one or more electronic devices (e.g., smart phone, personal digital/data assistant (PDA), tablet personal computing device, etc.) controlled by a user and adapted to send and receive data (e.g., electronic text messages, email, and the like) through the network 110 using an appropriate communication protocol (e.g., Internet Protocol (IP), etc.). In one or more embodiments, at least a subset of the user devices includes global positioning system (GPS) capabilities or similar apparatus for communicating geographical location information of the user to the CineMob platform 108. This information can be used, for example, to assist in locating a theater which is in close proximity to a given user for viewing a desired movie. It is to be understood that embodiments of the invention are not limited to any specific communication network or protocol. In one or more embodiments, the network 110 is implemented using the Internet or similar public networking system. In one or more alternative embodiments, the network 110 is implemented using a proprietary or private network, such as, for example a private subscription service or the like.

The theaters 112 and 114 in FIG. 1 represent physical movie screening facilities, and may, in one or more embodiments, utilize pre-existing movie theaters or at least a portion thereof. For example, in one or more embodiments, a movie theater may contract with the CineMob service to dedicate unsold seats, or even one or more movie screens, to subscribers of the CineMob service during prescribed times and/or days. In one or more alternative embodiments, one or more of the theaters 112 and 114 may be owned by the CineMob movie screening service, or a third party, for the exclusive use of its viewers 102, 104, 106.

The CineMob management platform 108 is configured to control one or more operations of the user-directed motion picture screening system 100. In one or more embodiments, the management platform 108 includes at least a first processor 116 coupled with a corresponding memory, represented herein as data store 118, and a second processor 120 coupled with a corresponding memory, represented herein as data store 122. It is to be appreciated that embodiments of the invention are not limited to any specific number of processors and memories. Each of at least a portion of the processors 116, 120, may be configured to perform a dedicated function. Alternatively, each of at least a portion of the processors 116, 120 may be adapted to operate in a distributed manner to perform multiple functions of the CineMob service. By way of example only and without limitation, in one or more embodiments, the first processor 116 is configured to coordinate movie screening requests and confirmations from the viewers 102, 104, 106, and the second processor 120 is configured to manage CineMob subscription information from viewers and theaters. Other processors (not explicitly shown, but implied) included in the management platform 108 may be configured to perform additional functions, such as, for example, payment processing.

Figure 2:
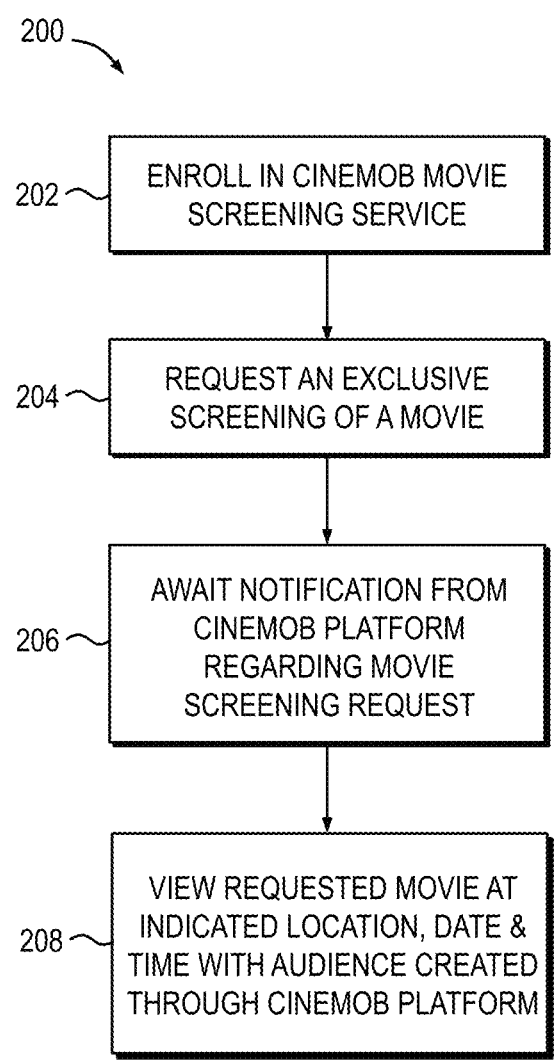
FIG. 2 is a flow diagram depicting at least a portion of exemplary method for implementing a user-directed motion picture screening service, from the standpoint of a user/viewer requesting a movie screening, according to an embodiment of the invention.

FIG. 2 is a flow diagram depicting at least a portion of exemplary method 200 for implementing a user-directed motion picture screening service (e.g., motion picture screening system 100 shown in FIG. 1), from the standpoint of a user/viewer requesting a movie screening, according to an embodiment of the invention. With reference to FIG. 2, one or more embodiments involve opt-in (e.g., via registration or enrollment) to the user-directed motion picture screening service, referred to herein as the CineMob service, by both viewers and theaters in step 202.

Specifically, a plurality of viewers (e.g., viewers 102, 104, 106 shown in FIG. 1) enroll in or otherwise register to become part of the CineMob service in step 202 in order to utilize features available through the service. By registering for the CineMob service, users agree to abide by the terms and conditions of the service, including, for example, the payment of bills for service issued by the CineMob service electronically, through a management platform (e.g., CineMob management platform 108 shown in FIG. 1) of the service or through a designated third party. In this regard, aspects of the CineMob service may utilize an existing electronic payment infrastructure or portion thereof, including, but not limited to, a credit card service (e.g., Visa, MasterCard, American Express, etc.), an electronic banking system, and the like.

Similarly, one or more movie screening facilities (e.g., theaters 112, 114 shown in FIG. 1) enroll in or otherwise register to become part of the CineMob service in step 202 in order to utilize features available through the service. By registering for the CineMob service, theaters agree to abide by the terms and conditions of the service, including, for example, the receipt of payments from the CineMob service electronically, through a management platform (e.g., CineMob management platform 108 shown in FIG. 1) of the service or through a designated third party.

The CineMob service, according to one or more embodiments, is an operational network or platform (e.g., governed by prescribed rules and/or standards) which facilitates communications between enrolled viewers and one or more theaters for the purpose of creating an exclusive screening of a desired motion picture in a selected theater as directed by a requesting viewer. In one or more embodiments, the CineMob service is implemented, at least in part, in the form of an Internet application (app), mobile device app, or the like, and may make use of known elements, such as, for example, an electronic billing/payment service, as previously stated. In one or more embodiments, the CineMob service is managed or otherwise maintained by a centralized processing platform (e.g., management platform 108 shown in FIG. 1). Alternatively, at least a portion of the CineMob service is managed or otherwise maintained in a distributed manner across multiple processing modules, as will become apparent to those skilled in the art.

Enrollment in step 202 may involve, in one or more embodiments, a viewer or theater providing prescribed identifying information, such as, for example, name/company, address, telephone number, email address, bank or credit card account number(s), etc. In an illustrative embodiment, as part of the enrollment process in step 202, a viewer creates a user account, which may include a username and login password. The viewer may then be asked to create a user profile containing personal information relating to the viewer, such as, but not limited to, name, default location, preferences, etc. Optionally, the viewer may identify, through social media (e.g., Facebook, LinkedIn, etc.) or other means, friends to add or connect with. Enrollment, in general, indicates to the CineMob management platform that the viewer or theater is an entity willing to participate in the CineMob service.

As an enhancement to the theater enrollment functionality, in one or more embodiments the CineMob service is configured to provide a theater/venue portal through which nearby theaters or other movie screening venues can compete with one another by bidding on mobs relating to requested movie screening events to host the event in their theater/venue, for example in a manner consistent with an online auction. Screening venues may also offer incentives (like discounts on concessions) to viewers as a means of attracting viewers to their particular venue. Additionally, the theater/venue portal, in one or more embodiments, is configured to enable theaters and other venues to post their current and/or expected inventory of available seats, in real time and/or over a prescribed duration (e.g., throughout the day or week), respectively. The CineMob management service can utilize this information, either alone or in conjunction with other criteria (e.g., mob size, average location of mob members, etc.) to determine an optimal venue for a given movie screening event (e.g., by matching a screening venue with as many system parameters as possible).

In one or more embodiments, viewers who initiate the screening of a desired movie may not reside within close proximity to a theater or other screening venue. In such instance, the CineMob system may beneficially provide, as a part of its service, a mobile theater which can be deployed to a prescribed location, such as a parking lot or other public locale, as either directed by the viewer initiating the movie screening event or as determined by the CineMob system based on certain criteria, such as, for example, the geographical locations (e.g., using GPS, etc.) of the curated audience for the movie screening event.

For example, in one or more embodiments, the CineMob system may determine that the curated audience members for a given movie screening event are not within a prescribed distance (e.g., 10 miles) from a fixed theater but are all within a two-mile radius of a designated public parking lot. The CineMob system then deploys a mobile theater to that designated parking lot location to set up a temporary movie screening venue, and sends out a notification message to all audience members indicating the address where the mobile theater will be set up. In essence, the CineMob service including this mobile theater feature is able to bring the theater to the audience, rather than the audience to the theater. In this manner, the CineMob system facilitates the establishment of on-demand, viewer-directed movie screenings even at locations where a theater or other screening venue does not exist, such as, for example, in farm or other rural communities, college campuses, and the like.

The viewer or theater, including mobile theaters which may be part of the CineMob service, may be assigned identification indicia, such as a unique identification number (e.g., user account number), by the CineMob service, and may select a username and password for accessing the user-directed movie screening program. In one or more embodiments, as part of the enrollment process, the viewer or theater may download a user application for use on its computing device (e.g., mobile phone, tablet computer, PDA, etc.) for providing secure access to the user-directed movie screening program running on the CineMob management platform. In one or more embodiments where the CineMob service includes a mobile theater capability, the CineMob service is configured to track the location of each mobile theater, using GPS or other tracking means, in real-time or close to real-time, as well as to track the availability of each mobile theater (i.e., whether or not a given mobile theater is currently in use) so as to more efficiently determine a suitable one of a fleet of mobile theaters to deploy for a given viewer-directed movie screening event. Vehicle tracking mechanisms suitable for use in conjunction with embodiments of the invention will be known to those skilled in the art (e.g., Vehicle Tracking Solutions (VTS), Fleetmatics, AwareGPS, Zubie, Inc., etc.).

From the standpoint of a viewer, for example, the user application may, in one or more embodiments, enable the viewer to initiate a request for the screening of a desired movie, identify other viewers similarly interested in viewing a requested movie, submit requests to join a movie screening audience (i.e., "mob") initiated by another subscriber in the CineMob service, as well as access other features of the CineMob service. Likewise, from the standpoint of a theater, for example, the user application may, in one or more embodiments, enable the theater to identify viewers who wish to screen a selected movie, submit a request to host a selected movie screening initiated by a viewer, set a minimum and/or maximum audience size for a given movie screening, generate a schedule of available dates/times for a given movie screening, as well as access other features of the CineMob service.

In one or more embodiments, the CineMob service is configured to provide a viewer portal through which viewers/users are provided the ability to customize one or more features of the service, in a manner consistent with the above-described theater/venue portal. The viewer portal, in one or more embodiments, may be implemented as settings within a user-directed motion picture screening application running on a user device (e.g., smartphone). For example, in one or more embodiments, the viewer portal may allow a user to set a certain maximum price that the viewer is willing to pay for screening a given movie; in essence, a "price watch" feature for setting a target ticket price, whereby viewers can conditionally join a mob relating to a movie screening event when the ticket price drops below a prescribed threshold amount set by the viewer.

The viewer portal may also be configured to allow viewers to provide certain information to the CineMob service, such as, for example, a friend list for inviting other viewers to join a mob, or a list of movie preferences, whereby viewers can choose the genre, actor, title, movie maturity rating (e.g., PG-13), etc., corresponding to their interests, and receive notifications when a movie is showing nearby which matches one or more of the identified parameters. For example, a user can set a maturity rating threshold in his or her profile so that the CineMob service restricts the user from receiving notifications for movies having a maturity rating above the set rating threshold. Marking interests also builds a profile for each user which can be used by the CineMob service to help curate future movie screening audiences (i.e., mobs), such as by suggesting movies that may appeal to the interests of a certain group of users based on their profiles.

Preferably, the user application is implemented as a downloadable application program. Instead of, or in addition to, a downloadable application program, a web-based interface could be employed in some embodiments. Once enrollment of the viewer or theater in the user-directed movie screening program is complete, the viewer or theater can avail itself of the services provided through the CineMob service. In one or more non-limiting embodiments, a viewer may employ a smart phone application while a theater may employ a downloadable user application or web-based interface; that is, the application(s) for interfacing with the CineMob service may be different among the various viewers and theaters utilizing the service.

In accordance with one or more embodiments, in step 204, a viewer initiates a request for an exclusive screening of a desired movie using the user application program, for example via an app running on the viewer's smartphone or other mobile device. The viewer request is routed to the CineMob management platform (108 in FIG. 1) through the network (110 in FIG. 1) or other communications means (e.g., a subscription service or the like). The management platform, upon receiving the viewer request for a screening of a prescribed movie, may, in one or more embodiments, send out a notification(s) to prospective participants (viewers and theaters) enrolled in the CineMob service regarding the movie request for the purpose of coordinating an audience of similarly interested viewers and at least one theater interested in hosting the movie screening. The CineMob service may, in one or more embodiments, utilize information (e.g., movie genre preference) identified in the users' personal profiles as a means of targeting viewers to send notifications of a requested movie screening event. In essence, the CineMob service coordinates communications between viewers and theaters for the purpose of creating a user-directed movie screening experience; in essence, an on-demand or virtual theater.

In one or more embodiments, viewers receiving a notification through the CineMob service regarding a movie screening request initiated by another viewer may opt to perform one or more actions in response to the notification. For instance, a disinterested viewer receiving the notification may choose to simply ignore the message. In one or more embodiments, viewers receiving the notification may be presented with selections buttons on their mobile device such as, for example, "Join" and "Decline," which when pressed are indicative of a viewer's desire to either join the movie screening audience or not join the audience, respectively. A viewer that selects the "Decline" button may, in one or more embodiments, avoid receiving subsequent notification messages from the CineMob service relating to that movie screening request.

In step 206, the viewer initiating the request for a movie screening event awaits receipt of a notification from the CineMob management platform regarding a status of the movie screening request; that is, whether or not the movie screening request has been granted. In one or more embodiments, a time period may be set, either by the viewer or by the management platform, during which the CineMob service attempts to assemble an audience for the requested movie screening event. By way of illustration only, a requesting viewer may set a time period of 24 hours for the CineMob service to assemble an audience for screening the selected movie, although it is to be understood that embodiments of the invention are not limited to any specific period of time. During this time, the CineMob service, in one or more embodiments, asks viewers who are interested in screening the requested movie to confirm their intention to join the movie screening audience via a corresponding application running on their mobile devices.

Once the number of confirmed, or otherwise interested, viewers reaches a prescribed minimum threshold to form a viewing audience of sufficient size (as may be set by a hosting venue), the CineMob management platform, in one or more embodiments, transmits a notification to the requesting viewer and all other viewers who indicated their intention to join the movie screening audience that the movie screening request has been granted. At this time, an opportunity to purchase movie tickets (e.g., digital tickets or "e-tickets") through the CineMob management platform may be presented to the viewers. The prescribed minimum threshold for the audience size may be set by the CineMob management platform based on one or more criteria associated with the local hosting venue screening the movie, such as, for example, the size of the screening room, the amount of revenue that the management platform wants to raise, the popularity of the requested movie, etc. A maximum limit may also be placed on the audience size; this maximum limit may be based on similar criteria (e.g., size of the movie screening room). The notification may, in one or more embodiments, comprise an acknowledgment message sent to the respective mobile devices of the requesting viewer and other confirmed viewers conveying information relating to the exclusive movie screening event, such as, for example, movie date, time and the name and location of the movie screening facility where the movie screening event is to be held.

It is to be understood that, in accordance with one or more embodiments of the present invention, the CineMob movie screening service establishes a contractual relationship with one or more movie screening facilities (e.g., theaters, auditoriums, etc.) for the purpose of hosting movie screening events directed by users/subscribers of the CineMob service. For example, CineMob may agree to purchase certain unused seats in local theaters for the exclusive use of its subscribed viewers. At this point, interaction is between the viewers/subscribers and the CineMob service, rather than between viewers and theaters directly; ticket sales, if any, are done through the CineMob service, in one or more embodiments, not through theaters or third party ticket services, like Fandango, etc. Hence, the CineMob movie screening service, under the control of the management platform, directs the primary aspects of the movie screening experience, including curating (i.e., assembling) an audience for a viewer-requested movie screening, setting the date/time, location, ticket prices, etc., associated with the viewer-requested movie screening event, and thereby establishes a new paradigm for motion picture viewing.

In step 208, upon receiving the notification that the requested movie screening event has been granted, the viewers screen the movie at the indicated hosting venue, date and time. Alternatively, if the minimum number of confirmed viewers is not reached during the prescribed time period (if a time period is set), the management platform sends a notification to the requesting viewer and to all other confirmed viewers indicating that the movie screening request could not be granted at this time. There may be other reasons as well for a viewer-initiated movie screening request to be denied unrelated to the failure to assemble an audience of sufficient size, including, for instance, the inability to locate a movie screening venue within a certain proximity to the requesting viewer.

Figure 3:
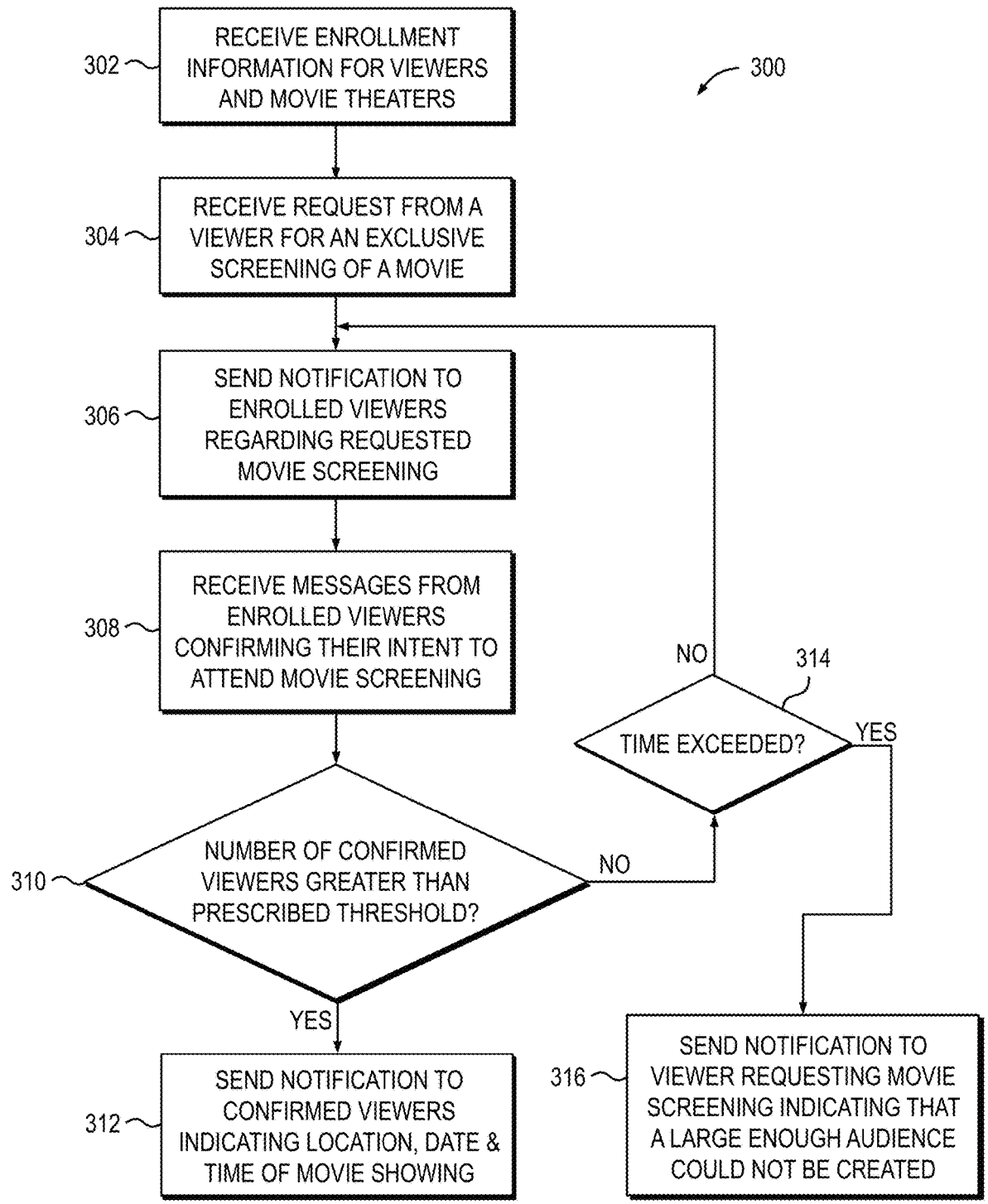
FIG. 3 is a flow diagram depicting at least a portion of exemplary method for implementing a user-directed motion picture screening service, from the standpoint of a management platform running the service, according to an embodiment of the invention.

FIG. 3 is a flow diagram depicting at least a portion of exemplary method 300 for implementing a user-directed motion picture screening service (e.g., motion picture screening system 100 shown in FIG. 1), from the standpoint of the CineMob management platform, according to an embodiment of the invention. With reference now to FIG. 3, one or more embodiments involve the management platform (e.g., CineMob management platform 108 in FIG. 1) receiving opt-in information from viewers and theaters to register or enroll in the user-directed motion picture screening service in step 302. This information, which may include, for example, name/company, address, phone number, email address, electronic payment or banking account numbers, among other data, is stored, in one or more embodiments, in memory (e.g., data store 118, 122 in FIG. 1) internal and/or external to the management platform. As previously stated, the CineMob service may purchase unsold seats in local theaters for the purpose of creating venues for screening requested movies. Accordingly, since the theaters having unsold seats may change frequently, the management platform is configured, in one or more embodiments, to regularly update and maintain a list of available movie screening sites.

In step 304, a request is received from an enrolled viewer for an exclusive screening of a selected movie. Upon receiving the movie screening request, the management platform, in step 306, sends out a notification to other enrolled viewers in a collaborative attempt to curate an audience for screening the selected movie at a given movie screening site with which the CineMob service has contracted. In step 308, the management platform receives and stores messages from enrolled viewers confirming their intention to join the audience of viewers screening the selected movie. The management platform will also maintain a list of one or more enrolled screening venues or sites that are available to host the selected movie screening event. In one or more embodiments, the management platform also maintains a schedule of available dates and/or times for the corresponding movie screening venues.

The management platform, in one or more embodiments, will maintain a count of, or otherwise track, the number of viewers that have indicated their intention to join the audience for screening the requested movie. This count is compared with a prescribed threshold in step 310. The prescribed threshold is preferably indicative of a minimum size of the viewing audience, which, in one or more embodiments, is established by the management platform based, at least in part, on the size of the local movie screening site selected to host the requested movie screening event. The prescribed threshold may also be based on other criteria, such as desired profit, etc. When the count has reached or exceeded the prescribed threshold, the management platform, in step 312, sends out a notification to the viewer who initiated the movie screening as well as to enrolled viewers who have confirmed their intention to join the viewing audience. As part of the notification feature, the CineMob management platform may, either automatically or manually by the user, perform a calendar sync to update a user's mobile device calendar application and/or set a reminder to the user regarding the movie screening event date, time and location. The CineMob management platform may also be configured to send out notifications and calendar updates to users regarding any cancellations or changes (e.g., movie time) to the scheduled motion picture screening event. In one or more embodiments, the management platform may also send a notification to an identified movie screening venue confirming details regarding the selected movie screening event.

Optionally, the management platform, in step 312, may establish a second threshold indicative of a prescribed maximum size of the viewing audience (not explicitly shown, but implied). Setting an upper limit on the size of the audience will ensure that a selected movie screening venue has ample seats for all of the confirmed moviegoers.

Alternatively, when the count of confirmed viewers is compared with the prescribed threshold and it is determined, in step 310, that the prescribed threshold has not been reached, the management platform, in step 314, checks to see if a set time period for curating the selected movie viewing audience has expired, assuming a time period has been established. If the time period has not yet expired, the management platform will proceed back to step 306 where it will wait for additional confirmations to be received from viewers interested in screening the requested movie. At this time, the management platform may transmit another notification to enrolled viewers reminding them that there is an open movie screening request. In one or more embodiments, viewers and theaters may be presented with a list of available movie screening audience curation (i.e., "mobbing") opportunities on their respective mobile devices. If, in step 314, it is determined that the time period for assembling the movie screening audience has expired, the management platform will send a notification to the viewer who initiated the movie screening request, as well as to the other interested viewers and theater(s), in step 316 indicating that an audience of sufficient size could not be assembled within the set time period. In one or more embodiments, when an audience of sufficient size cannot be assembled within the set period of time, the management platform may send a message to the initiating viewer requesting whether the viewer would like to extend the window of time for assembling the movie screening audience, assuming the time period was originally established by the requesting viewer.

By way of illustration only and without limitation, an operation of an exemplary CineMob application according to one or more embodiments of the invention will be described in further detail, in conjunction with FIGS. 4 through 14. It is to be appreciated that the screen shots shown in the figures are merely conceptual, and that various other means of presenting (e.g., displaying) and/or inputting information associated with the CineMob user-directed movie screening service are similarly contemplated and are intended to fall within the scope of the present invention.

Figure 4:
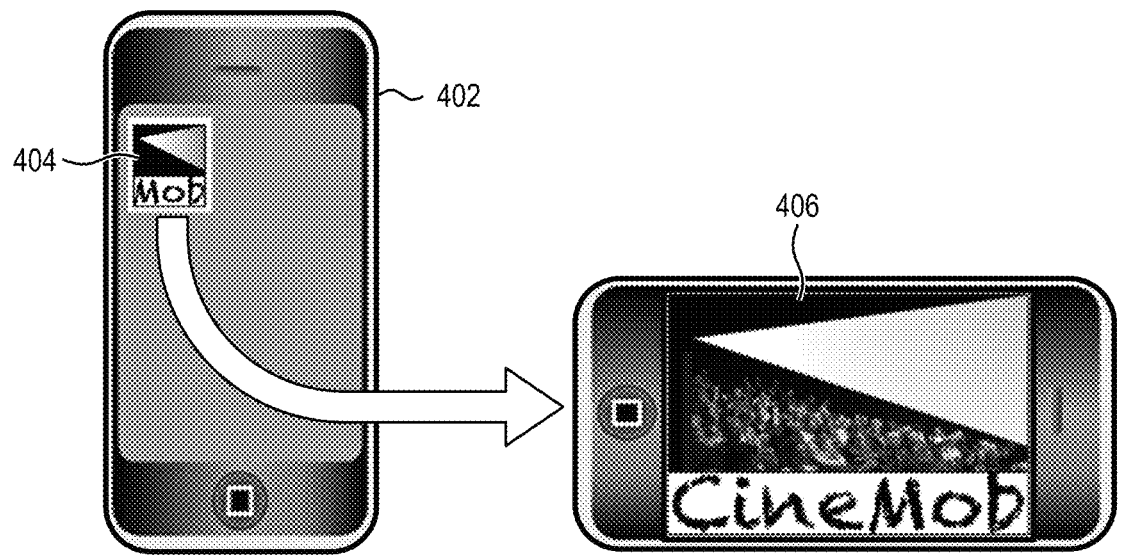
FIG. 4 conceptually depicts at least a portion of an exemplary user-directed movie screening application program running on a mobile device, according to an embodiment of the invention.

FIG. 4 conceptually depicts at least a portion of an exemplary CineMob application running on a mobile device, according to an embodiment of the invention. With reference to FIG. 4, a home screen of a mobile device 402 is shown which includes a CineMob user-directed movie screening application icon (i.e., app) 404. By tapping or otherwise activating the CineMob app 404 on the mobile device screen, or using other selection means (e.g., cursor, etc.), a CineMob application program will start running and display a top menu screen 406 on the mobile device. The menu screen 406 provides certain regions or buttons which, when selected by a user, cause corresponding actions to be performed by the CineMob program.

Figure 5:
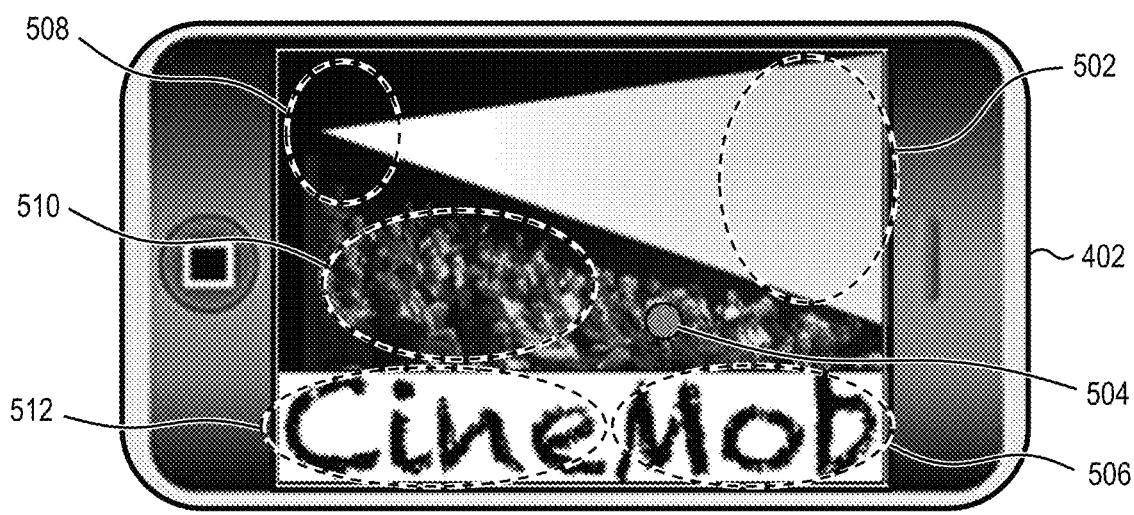
FIG. 5 depicts at least a portion of an exemplary top-level menu page/screen of the user-directed movie screening application program running on the mobile device, according to an embodiment of the invention.

For example, FIG. 5 depicts at least a portion of an exemplary top-level menu screen/page of the CineMob application program running on the mobile device 402, according to an embodiment of the invention. The top menu page, in this embodiment, includes six selection regions, 502, 504, 506, 508, 510 and 512, each corresponding to a prescribed task or tasks performed by the CineMob program when activated (i.e., selected, such as by tapping on an area of the display 602 proximate the corresponding selection region), although it is to be understood that embodiments of the invention are not limited to any specific number of selection regions or tasks assigned to a given region or regions.

Figure 6:
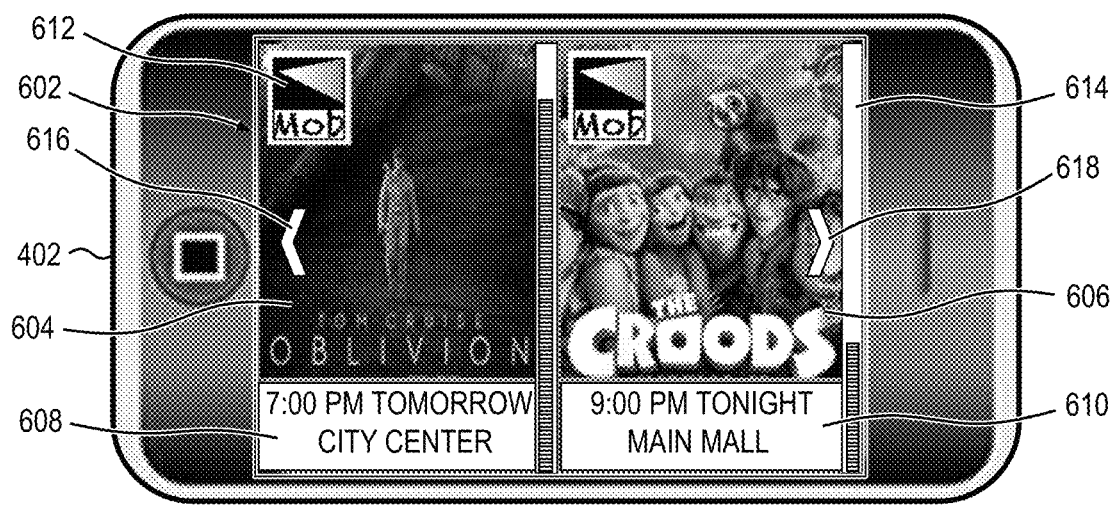
FIG. 6 is an exemplary screen shot depicting at least a portion of a second menu page of the user-directed movie screening application program running on the mobile device, according to an embodiment of the invention.

A first region 502, representing an area proximate the movie screen on the top menu page, when selected (e.g., tapped by the user), is used to initiate an action by the program to inform the user of which movies are currently "mobbing;" that is, which movies have pending requests by other viewers to form an audience (i.e., "mob") for screening the respective movies. Thus, by tapping or otherwise selecting the first selection region 502, the user will be presented with a second menu page, referred to herein as a "What's Mobbing Now" screen, an example of which is depicted in FIG. 6, according to an embodiment of the invention. The second menu page is preferably on a different hierarchical level than the top menu page. With reference now to FIG. 6, a display portion 602 of the mobile device 402 shows two movie posters, 604 and 606, of current audiences (mobs) that are forming through the CineMob movie screening service. Shown beneath each movie poster 604 and 606 is informational text, 608 and 610, respectively, describing the date/time and location of the corresponding movies. Although two movies are depicted in the display portion 602 of the mobile device 402 in this conceptual illustration, the CineMob program, in one or more embodiments, may provide the user with preference settings which allow the user to change how the information presented on any of the pages is displayed; in the case of the "What's Mobbing Now" screen, the CineMob program can display more or less than two movies at a time, as set by the user.

On each movie poster 604, 606 presented on the "What's Mobbing Now" screen is a selection button 612, referred to herein as a "Join Mob" button, which, when selected (e.g., tapped) by the user, allows the user to join an audience for the corresponding movie. A user may join the audience of more than one movie. An optional feature of the CineMob program checks to see that when a user selects multiple movie screening audiences to join, the time and date of the movie screening events do not conflict with one another. Each movie poster may, in one or more embodiments, include an indicator bar 614 or other indication means, which visually presents information regarding how close a given movie screening event is to reaching the prescribed minimum threshold set for that event; alternatively or additionally, an audible indication which conveys the same or similar information regarding mobbing progress may also be employed. In this manner, the user can gauge the interest level in a given movie, which may assist the user in making a determination as to whether or not to join the audience. Although displayed in this example as a vertical progress bar (thermometer), embodiments of the invention contemplate various other ways of displaying the mobbing progress of a given movie, including, but not limited to, horizontal indicator bars, circles, color-changing objects (e.g., a bar or circle changing from red to green as the size of the audience increases), etc., as will become apparent to those skilled in the art. In one or more embodiments, the user may be given options in a preference setting menu for changing how this and other information is presented on the mobile device 402.

In order to easily display the movies available for mobbing, navigation buttons 616 and 618 are presented which, when selected, allow the user to scroll backward or forward, respectively, through the listing of movie titles that currently have audiences available to join; these titles represent pending and active requests by viewers for movie screenings. In one or more alternative embodiments, in addition to or instead of using navigation buttons, users may scroll through the movie list by swiping the display portion 602 of the mobile device 402 in the direction that they want the list to move, much like flipping through pages of a book. This swiping technique is well known in the art.

Figure 7:
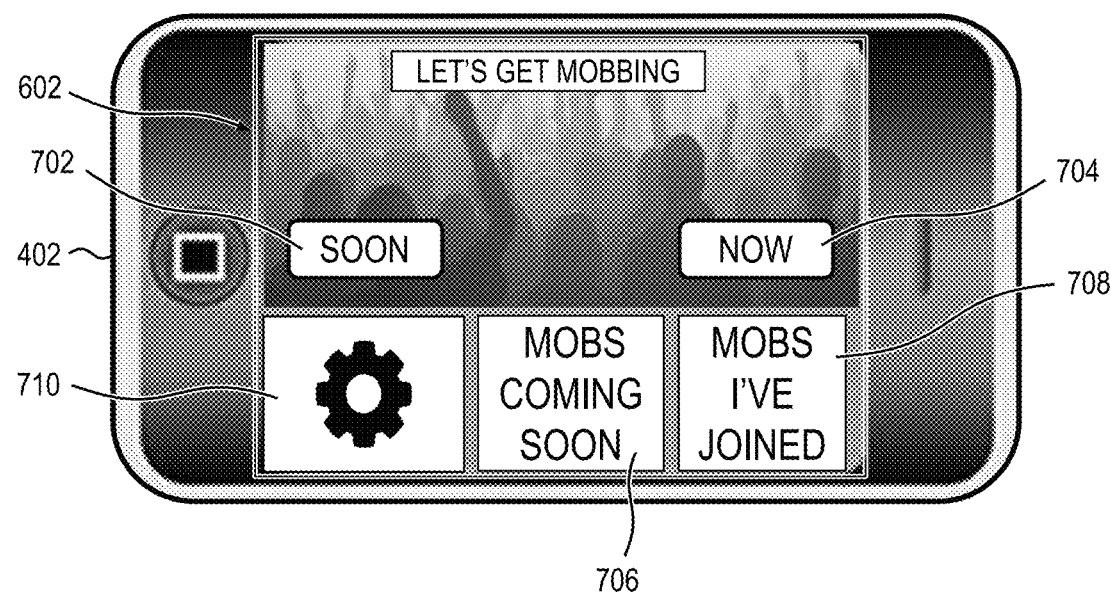
FIG. 7 is an exemplary screen shot depicting at least a portion of a third menu page of the user-directed movie screening application program running on the mobile device, according to an embodiment of the invention.

With continued reference to FIG. 5, a second selection region 504, representing an area in the audience on the top-level menu page, when selected, is used to initiate an action by the CineMob program to control certain criteria associated with the user, such as, for example, user preferences, user mobbing history, future mobbing intentions, etc. Specifically, by tapping or otherwise activating the second selection region 504, the user will be presented with a third menu page, referred to herein as an "It's Me" screen, an example of which is depicted in FIG. 7, according to an embodiment of the invention. The third menu page is preferably on a different hierarchical level than the top menu page.

With reference to FIG. 7, a display portion 602 of the mobile device 402 shows various selection buttons which can be used to manage the user's personal information used by the CineMob service, as well as to view the user's past, present and/or future mobbing history and intentions. In this embodiment, the third menu page presents first and second selection buttons, "Soon" 702 and "Now" 704, which, when activated (i.e., selected, such as by tapping an area of the screen proximate the corresponding button), conveys the user's intention to either join a movie screening audience (i.e., "mob") in the near future or join immediately, respectively. The third menu page also displays a fourth selection button ("Mobs Coming Soon") 706, which, when selected, presents the user with a list of movie screenings that he or she is waiting to join/mob. A fifth selection button ("Mobs I've Joined") 708, when selected, displays a list of mobs the user has joined as a reminder of the upcoming movie screenings to which the user has already committed. A settings button 710 presented on the display portion 602 of the mobile device 402, when selected, presents a list of parameters that the user may view and/or change, including, for example, user location(s), display preferences, credit card information, purchasing history, friends, etc.

Figure 8:
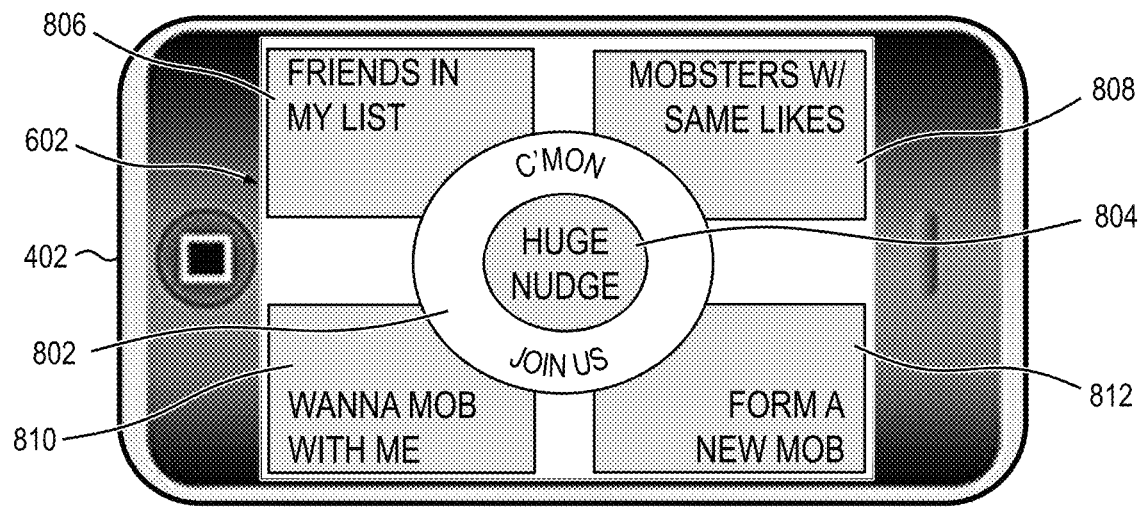
FIG. 8 is an exemplary screen shot depicting at least a portion of a fourth menu page of the user-directed movie screening application program running on the mobile device, according to an embodiment of the invention.

With reference again to FIG. 5, a third selection region 506, representing an area proximate the text "Mob" on the top menu page, when selected, is used to initiate an action by the CineMob program to control the formation of a mob relating to an existing movie screening request or to a new movie request directed by the user. By tapping or otherwise selecting the third selection region 506, the user will be presented with a fourth menu page, referred to herein as a "Mob/Nudge" screen, an example of which is depicted in FIG. 8, according to an embodiment of the invention. The fourth menu page is preferably on a different hierarchical level than the top menu page.

As depicted in FIG. 8, on the "Mob/Nudge" menu screen, the display portion 602 of the mobile device 402, in this illustrative embodiment, includes several selection buttons which allow the user to control the formation of mobs relating to a given movie or movies. For example, first and second selection buttons, "C'mon Join Us" 802 and "Huge Nudge" 804, when activated (i.e., selected, such as by tapping an area on the screen 602 proximate the corresponding button), are used to encourage (i.e., nudge) potential audience participants (e.g., friends and/or other viewers with similar movie interests) or really nudge them, respectively, to join a selected movie screening audience. Friends that the user wishes to nudge can be chosen from a list of active friends, which may be displayed on a portion of the same page or a different page that is lower (or higher) in a hierarchical menu tree, by activating a third selection button ("Friends in my List") 806. Likewise, the user can encourage other viewers with identified similar movie interests using a fourth selection button ("Mobsters w/Same Likes") 808.

The "Mob/Nudge" menu screen, in one or more embodiments, further provides a means of joining an existing mob with one or more friends by activating a fifth selection button ("Wanna Mob with Me") 810, or the user can create a new audience for a given movie by activating a sixth selection button ("Form a New Mob") 812.

Figure 9:
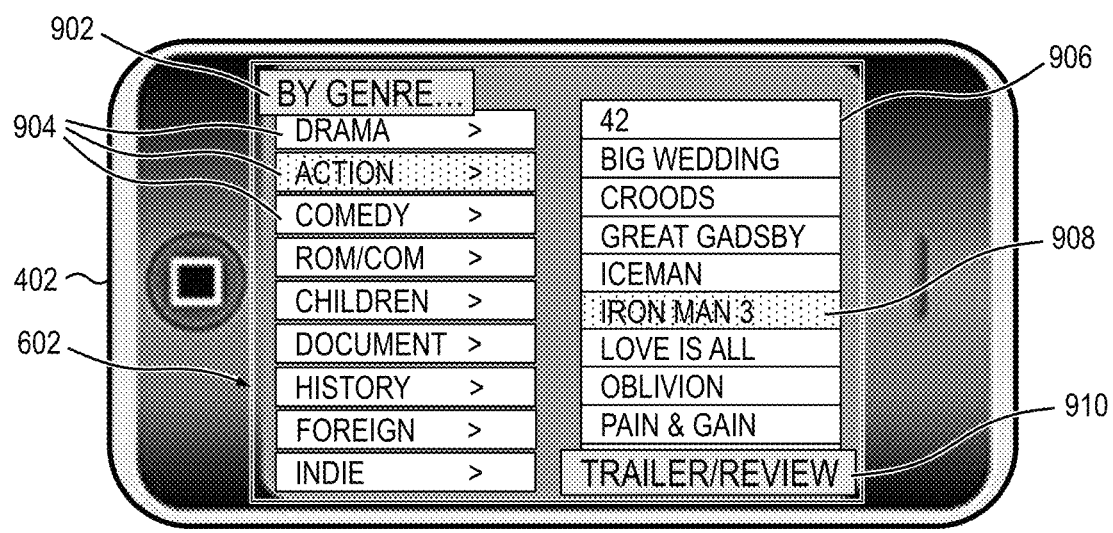
FIG. 9 is an exemplary screen shot depicting at least a portion of a fifth menu page of the user-directed movie screening application program running on the mobile device, according to an embodiment of the invention.

Returning to FIG. 5, a fourth selection region 508, representing an area proximate the projection booth on the top menu page, when selected, is used to initiate an action by the CineMob program to view movies available for screening at local theaters enrolled in the CineMob service. By tapping or otherwise selecting the fourth selection region 508, the user will be presented with a fifth menu page, referred to herein as a "What's Mob-able" screen, an example of which is depicted in FIG. 9, according to an embodiment of the invention. The fifth menu page is preferably on a different hierarchical level than the top menu page.

With reference to FIG. 9, the fifth menu page, in this embodiment, presents the user with a list of movies available for screening at local theaters within a prescribed distance (e.g., two miles) from the user's designated default location (s). The manner in which the list of movies is displayed may be controlled by the user, in one or more embodiments. By way of example only, FIG. 9 shows other available movie events curated by the CineMob service and organized by genre 902, wherein a plurality of categories 904 are presented for selection by the user. Upon selection of a desired movie category (e.g., "Action"), the category is preferably highlighted on the display and a secondary listing 906 of available movie titles is presented which are considered part of the selected category. The user may then select one or more of the movie titles, which may contain a link, in one or more embodiments, that, when activated, enables the user to watch a trailer for the movie, read a review of the movie, join an existing mob relating to that movie or, if a mob is not currently pending, initiate a new mob for screening the requested movie. Once selected, the movie title is preferably highlighted (e.g., "Iron Man 3" 908, in this illustration). In one or more embodiments, a trailer and/or review of a given movie may be presented by selecting a "Trailer/Review" button 910 on the menu page. Activation of the trailer/review button 910 causes the CineMob application to display a movie trailer or review, as appropriate, for a selected movie in the display portion 602 of the mobile device 402.

Figure 10:
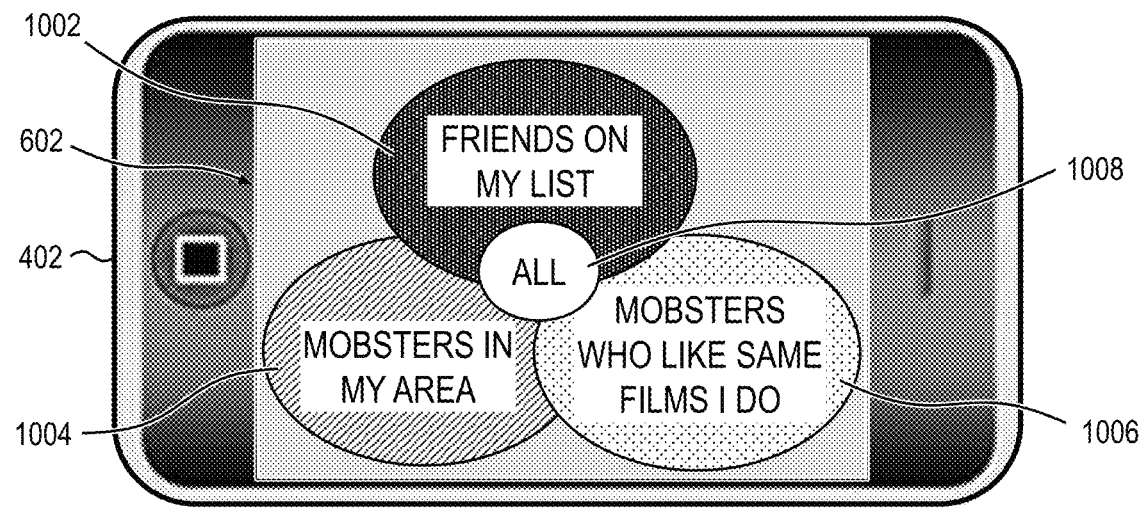
FIG. 10 is an exemplary screen shot depicting at least a portion of a sixth menu page of the user-directed movie screening application program running on the mobile device, according to an embodiment of the invention.

By activating a fifth selection region 510 shown in FIG. 5, representing an area proximate the movie audience on the top-level menu page, an action is initiated by the CineMob program to determine which movies an enrolled viewer or group of viewers are currently mobbing. By tapping or otherwise selecting the fifth selection region 510, the user will be presented with a sixth menu page, referred to herein as a "Who's mobbing" screen, an example of which is depicted in FIG. 10, according to an embodiment of the invention. The sixth menu page is preferably on a different hierarchical level than the top menu page.

FIG. 10 is an exemplary screen shot depicting at least a portion of what is presented to the user in the display region 602 of the mobile device 402 upon activating the fifth selection region 510 on the top-level menu page, according to an embodiment of the invention. In this illustrative embodiment, the sixth menu page is configured to enable the user to check a mobbing status (i.e., which movie screening audience(s) a viewer or group of viewers has joined) of one or more enrolled viewers in the CineMob service. Specifically, the sixth menu page includes three groups of viewers; namely, a first group ("Friends on My List") 1002, a second group ("Mobsters in My Area") 1004 and a third group ("Mobsters Who Like Same Films I Do") 1006. It is to be appreciated that embodiments of the invention are not limited to any specific organization of viewers, and thus is not limited to any particular number of groups displayed on the sixth menu page.

Each of the groups 1002, 1004, 1006 has a corresponding selection button associated therewith which can be activated by tapping, or by using another selection means, a region proximate the group icons. For example, by selecting the first group 1002, the user can check the mobbing status of designated friends enrolled in the CineMob service. By selecting the second group 1004, the user can check the mobbing status of enrolled local viewers within a prescribed distance of the user. Likewise, by selecting the third group 1006, the user can check the mobbing status of enrolled viewers who have movie preferences similar to those of the user. A fourth selection button ("All") 1008 may be activated for determining the mobbing status of all enrolled viewers. In one or more embodiments, using information provided through the sixth menu page, the user can determine which viewer or groups of viewers to encourage to join (i.e., nudge) a pending movie screening audience/mob.

Figure 11:
FIG. 11 is an exemplary screen shot depicting at least a portion of a seventh menu page of the user-directed movie screening application program running on the mobile device, according to an embodiment of the invention.

Referring again to FIG. 5, a sixth selection region 512, representing an area proximate the text "Cine" on the top menu page, when selected, is used to initiate an action by the CineMob program to view trailers and/or reviews of available movies in the CineMob library and available for mobbing, of movies which are currently mobbing (i.e., there are pending viewer screening requests for movies at local theaters enrolled in the CineMob service), and coming attractions. By tapping or otherwise selecting the sixth selection region 512, the user will be presented with a seventh menu page, referred to herein as a "Trailers/Reviews" screen, an example of which is depicted in FIG. 11, according to an embodiment of the invention. The seventh menu page is preferably on a different hierarchical level than the top menu page.

FIG. 11 is an exemplary screen shot depicting at least a portion of the seventh menu page of the user-directed movie screening application program running on the mobile device 402, according to an embodiment of the invention. As shown in FIG. 11, the display portion 602 of the mobile device 402 includes a first selection button, "Watch Trailer" 1102, and a second selection button, "Read Review" 1104, which, when activated, presents a trailer or a review, respectively, of a selected movie in a prescribed area 1106 of the display 602. The trailer/review menu page may also be available through other menu pages, such as, for example, the film listing on the "What's Mob-able" (FIG. 9) and "Who's Mobbing" (FIG. 10) menu pages, in one or more embodiments.

Figure 12:
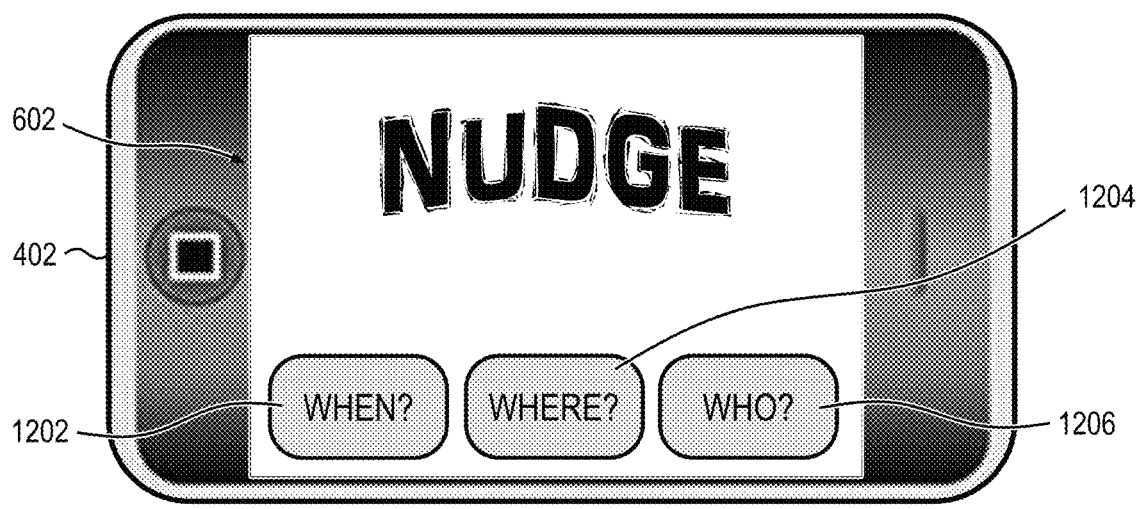
FIG. 12 is an exemplary screen shot depicting at least a portion of a first notification page presented on a mobile device, according to an embodiment of the invention.

The CineMob program may also be configured to present certain notifications, such as, for example, notifications that the user has been nudged, notifications that a given mob threshold has been met, mob reminders, etc. In one or more embodiments, the user may set preferences which control the type and/or manner in which the CineMob program presents notifications. By way of illustration only and without limitation, FIG. 12 is an exemplary screen shot depicting at least a portion of a first notification page displayed on a mobile device, according to an embodiment of the invention. The first notification page, which may be referred to herein as a "You've Been Nudged" page, presents the user with three action buttons in the display portion 602 of the mobile device 402, "When?" 1202, "Where?" 1204 and "Who?" 1206, which, when activated/selected allows the user to determine when a given mob is scheduled, where the mob is forming, and who is encouraging the user to join the mob, respectively.

Figure 13:
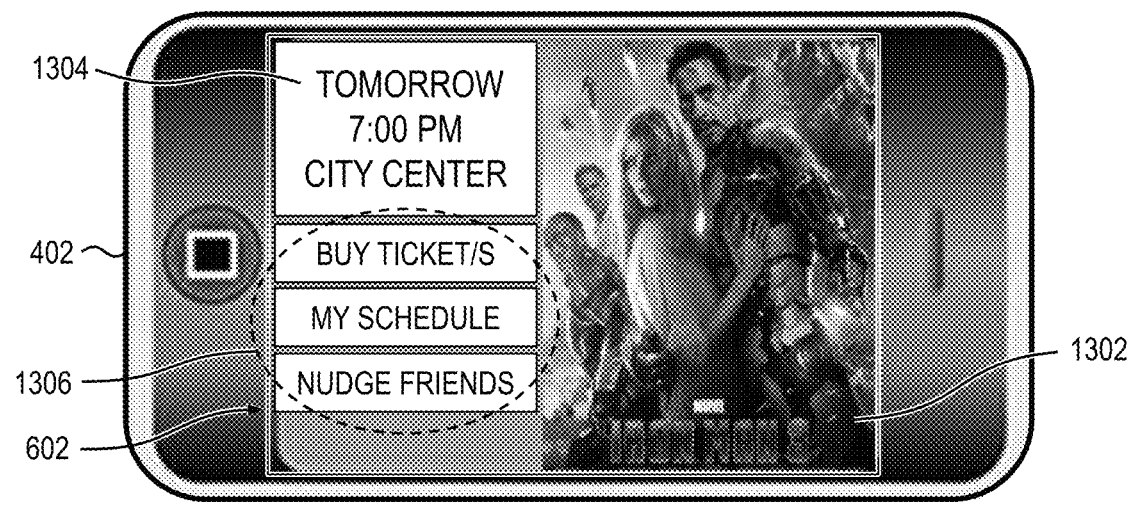
FIG. 13 is an exemplary screen shot depicting at least a portion of a second notification page presented on a mobile device, according to an embodiment of the invention.

FIG. 13 is an exemplary screen shot depicting at least a portion of the second notification page presented on the display portion 602 of the mobile device 402, according to an embodiment of the invention. As previously stated, in order to grant a viewer movie screening request, a prescribed minimum threshold for the size of the audience (i.e., mob) must first be met. This minimum audience size, which may be referred to herein as a "mob threshold," in one or more embodiments, is assigned to each viewer movie screening request and may be based on certain criteria, such as, for example, the size of the theater hosting the movie screening, among other factors. In this illustrative embodiment, the second notification page, which may be referred to as a "Mob Threshold Met" page, is used to indicate to the user that the mob threshold has been met for a given movie of interest, which is displayed as a movie poster 1302 or similar means (e.g., text, etc.). Information 1304 relating to the movie screening, such as, for example, the screening date, time and location, is presented in the display portion 602 of the mobile device 402. Additionally, a user action portion 1306 of the display provides selection buttons that the user can activate for taking appropriate actions in response to the notification, including, but not limited to, buying tickets for the movie, checking the user's schedule, and nudging friends or other interested viewers to join the user in screening the movie.

When an upper limit on the audience size is set for a given movie screen request, a notification message may be sent to viewers' mobile devices that have expressed an interest in the movie indicating that the movie is sold out; that is, no further viewers can join the audience. Additionally, the movie is removed from the list of currently available movies presented to viewers (e.g., on the "What's Mobbing Now" screen shown in FIG. 6).

Figure 14:
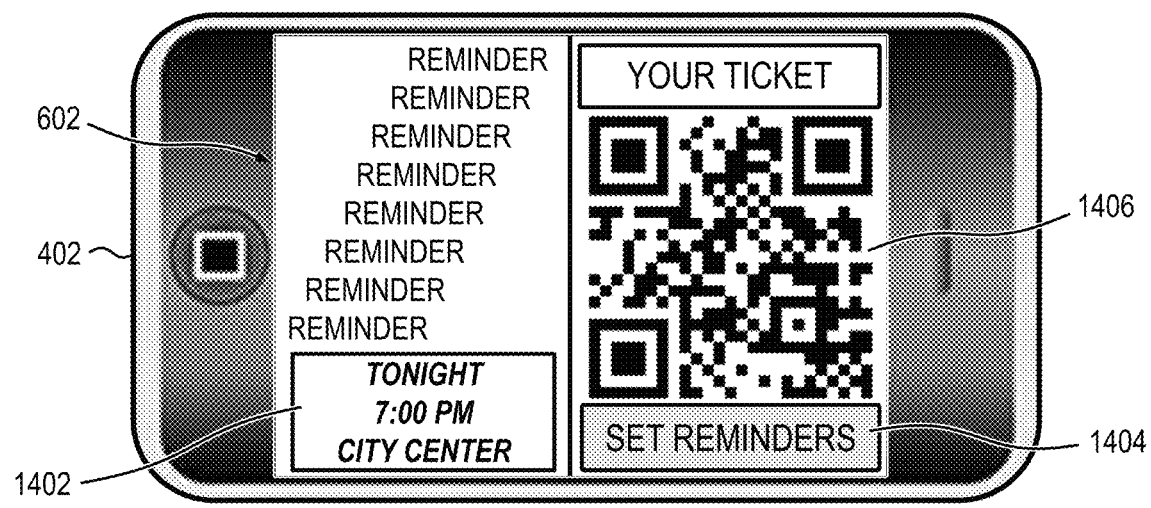
FIG. 14 is an exemplary screen shot depicting at least a portion of a third notification page presented on a mobile device, according to an embodiment of the invention.

FIG. 14 is an exemplary screen shot depicting at least a portion of a third notification page presented on the display portion 602 of the mobile device 402, according to an embodiment of the invention. In this illustrative embodiment, the third notification page, which may be referred to as a "Mob Reminders" page, presents user-customizable reminders 1402 regarding mobs, including, for example, the date, time and location of the movie screening. Reminders may be set, in one or more embodiments, by activating a selection button, "Set Reminders" 1404, provided on the display portion 602. This notification page, in one or more embodiments, also provides a digital ticket 1406, shown in FIG. 14 in the form of a QR code, which can be presented to the theater for admission in lieu of a traditional paper ticket.

Operation of an Illustrative Embodiment

By way of example only and without limitation, an overview of the operation of an illustrative viewer-directed motion picture screening service, referred to herein as "CineMob," according to one or more aspects of the present disclosure will be described. CineMob will purchase empty theater seats from exhibitors for its private screenings. CineMob will offer its private screening schedule upon a distributor's notification that the picture has completed its theatrical first run in a given market. CineMob will market its available private screenings to enrolled users/viewers, or other visitors of its site, using, for example, daily updated Internet listings, social networking sites, or the like. Users will be offered the opportunity to indicate their interest in an upcoming release. Upon availability, CineMob will confirm dates, show times and screening locations. Revenue will be generated per screening (e.g., pay-per-use), from membership agreement fees, advertising, promotions, licensing to third parties, and/or other means. Screening inventory may be pre-sold to commercial sponsors, either on a sole presenter basis or on a multiple ad format, in one or more embodiments. CineMob will create promotional opportunities within its screenings and may, in one or more embodiments, pre-sell its screenings to institutions and organizations based on a particular film's educational, cultural and/or social content.

Although embodiments of the present invention have been described herein in the illustrative context of viewers directing private movie screenings in local theaters or other screening facilities, it is to be appreciated that aspects according to embodiments of the invention may also be used in conjunction with other applications, such as, but not limited to, curating audiences for film festivals and the like. Moreover, embodiments of the invention can provide on-demand movie screening services in a language other than English, which may benefit a variety of ethnic, cultural and religious groups seeking to partake in screenings of films in their original languages.

Regarding film festivals, today more than 400 film festivals are celebrated in the U.S. annually. These film festivals may be dedicated to prescribed genres, including, for example, family, horror, science fiction, comedy, etc. Some film festivals are dedicated to ethnic preferences; others, to political, environmental, and/or other causes. By exploiting capabilities of the CineMob viewer-directed movie screening service for curating audiences directed to requested screening events, embodiments of the invention can be used to advantageously expand the limited running time of viewers' favorite film festivals. More particularly, the CineMob service, according to one or more embodiments, will create private screening events, as requested by enrolled subscribers, aimed at various publicly desired festival highlights, thereby expanding the screening windows of the respective festivals.

As a further application of the CineMob viewer-directed motion picture screening service, users, in one or more embodiments, can purchase a private event curation package, whereby the CineMob service is operative to curate the entire experience. By way of example only and without limitation, a user might purchase a birthday party package in which the CineMob service coordinates obtaining a requested movie, booking the screening venue, and handling related aspects of the event, such as providing food (birthday cake, pizza, etc.), balloons and/or party favors. Similarly, a user might purchase a ski party package in which the CineMob service coordinates obtaining a requested movie, which can be selected to match the event theme (e.g., a ski-themed movie), booking a movie screening venue, which may be mountainside in a ski town, and serving warm drinks and food. In one or more embodiments, a company, using the CineMob curation service, may sponsor a private movie screening event. For example, BMW may utilize the CineMob service to curate an audience for screening an historical movie series. Applications for using the CineMob service to curate a private movie viewing experience are limited only by the user's imagination.

In one or more embodiments, the CineMob service may be used to recreate a film festival for members of a community, as previously stated. In this embodiment, films would be shown at a local screening venue, arranged through the CineMob service, and many of the special event aspects could be incorporated into the package to allow attendees to feel as though they are experiencing an actual film festival environment. Hence, the CineMob service event curation package can be custom-tailored to an individual event.

Given the discussion thus far, it will be appreciated that a method for facilitating a viewer-directed motion picture screening event includes: enrolling a plurality of viewers and at least one motion picture screening facility in a viewer-directed motion picture screening service, via a management module executing on at least one hardware processor; sending a request for screening a given motion picture, initiated by at least one of the plurality of viewers, to the management module; receiving, by the at least one viewer, notification from the management module regarding a status of the request for screening the given motion picture; and when the notification from the management module indicates that the request for screening the given motion picture has been granted, sending information by the management module to the at least one viewer regarding at least one of a date, time and location of the viewer-directed motion picture screening event established for viewing the given motion picture.

Given the discussion thus far, it will also be appreciated that an apparatus for facilitating a viewer-directed motion picture screening event includes: a memory; at least one processor coupled with the memory; and a management module executing on the at least one processor. The management module is configured: to enroll a plurality of viewers and at least one motion picture screening facility in a viewer-directed motion picture screening service; to receive, from at least one of the plurality of viewers, a request for screening a given motion picture; to send a notification to the at least one viewer regarding a status of the request for screening the given motion picture; and, when the request for screening the given motion picture has been granted, to send information to the at least one viewer regarding at least one of a date, time and location of the viewer-directed motion picture screening event established for viewing the given motion picture.

Given the discussion thus far, it will further be appreciated that an article of manufacture for facilitating a viewer-directed motion picture screening event includes a non-transitory computer-readable storage medium storing instructions which, when executed by a processor, causes the processor to be operative: to enroll a plurality of viewers and at least one motion picture screening facility in a viewer-directed motion picture screening service; to receive, from at least one of the plurality of viewers, a request for screening a given motion picture; to send a notification to the at least one viewer regarding a status of the request for screening the given motion picture; and when the request for screening the given motion picture has been granted, to send information to the at least one viewer regarding at least one of a date, time and location of the viewer-directed motion picture screening event established for viewing the given motion picture.

Figure 16:
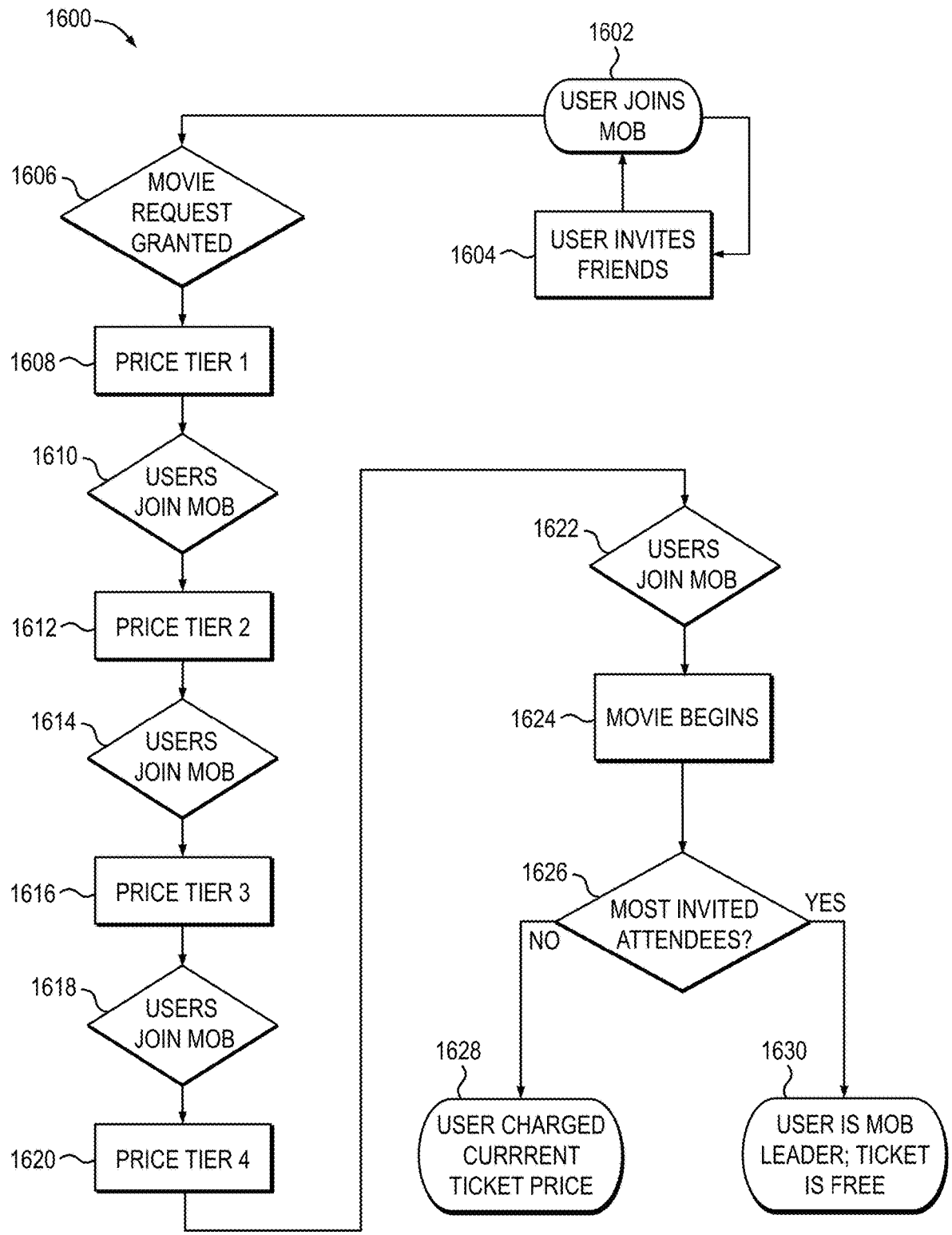
FIG. 16 is an exemplary dynamic pricing methodology implemented by the user-directed motion picture screening system, according to an embodiment of the invention.

In one or more embodiments, the CineMob viewer-directed motion picture screening service is operative to adjust the pricing of tickets as a function of one or more criteria influencing the service. Preferably, the pricing methodology utilized by the motion picture screening service is dynamic so as to accommodate changing external conditions (e.g., number of movie attendees, desired revenue, venue cost, etc.). With reference to FIG. 16, an exemplary dynamic pricing methodology 1600 implemented by the CineMob management platform (e.g., 108 in FIG. 1) will now be described, according to an embodiment of the invention.

As shown in FIG. 16, a user of the viewer-directed motion picture screening service may choose to join an audience (i.e., mob) relating to an existing movie screening request or to a new movie request directed by the user in step 1602. In order to ensure that the requested movie screening is ultimately granted, the user may invite friends and other potential movie attendees to join the audience in step 1604. This audience curation process may continue until a prescribed minimum attendance threshold (a first or initial attendance threshold) for the requested movie screening has been met in step 1606. The attendance threshold, $A_T$, for any given pricing tier may be determined (e.g., by the CineMob management platform 108 in FIG. 1) by evaluating one or more parameters of the motion picture screening service, including, for example, desired revenue ($D_R$), ticket price ($T_P$) corresponding to the given pricing tier, theater/venue cost ($T_C$) and studio percentage ($S_P$), among other parameters. In one or more embodiments, the attendance threshold $A_T$ is determined according to the following expression:

$$A_T = \frac{\frac{(T_C \cdot D_R) - T_C}{1 - S_P} + T_C}{T_P} \tag{1}$$

Aspects of the invention may contemplate other ways to generate an attendance threshold, as will become apparent to those skilled in the art given the teachings herein. Since revenue will be determined by the number of movie screening attendees, A, multiplied by the ticket price $T_P$, the total revenue, R, at the attendance threshold $A_T$ can be determined as:

$$R = \frac{(T_C \cdot D_R) - T_C}{1 - S_P} + T_C, \tag{2}$$

and total profit, P, can be determined as:

$$P = (R - T_C) \cdot (1 - S_P) \tag{3}$$

Once the prescribed minimum attendance threshold for the requested movie screening has been met in step 1606 and the requested movie screening is granted, the movie ticket price $T_P$ is set equal to the first pricing tier (Price Tier 1) in step 1608 by the CineMob pricing methodology 1600. In this initial pricing tier, the desired revenue is normalized to 1.0, which may be a breakeven point, and the ticket price is equated to a market price.

Once the breakeven point is exceeded, as more users continue to join the audience relating to the requested movie screening, the pricing methodology 1600 dynamically responds by reducing the ticket price, or crediting the users, for at least a subset of the attendees. Specifically, in step 1610, the attendance threshold is set to a second value indicative of the number of attendees necessary to achieve a second pricing tier (Price Tier 2). Using expression (1) above, it can be shown that as the ticket price $T_P$ is decreased, the attendance threshold must increase in order to maintain the same desired revenue. Step 1610 monitors the number of users who have joined the audience for the requested movie screening and compares this number against the second attendance threshold. Once this second attendance threshold is reached, step 1612 is operative to set the ticket price to a second (lower) amount according to parameters of the second pricing tier. The difference between the ticket price for the second pricing tier and the ticket price for the first pricing tier may be relative (e.g., a percentage) or absolute (e.g., a fixed dollar amount) as desired.

In step 1614, the number of users who have joined the mob for the requested movie screening continues to be monitored and compared against a third attendance threshold indicative of the number of attendees necessary to reach a third pricing tier (Price Tier 3). Once this third attendance threshold is met, step 1616 is operative to set the ticket price to a third amount according to parameters of the third pricing tier. As in the case of the second pricing tier parameters used in step 1612, the amount that the ticket price is adjusted compared to the second tier ticket price may be relative (e.g., a percentage reduction) or absolute (e.g., a fixed dollar reduction). In step 1618, the number of users who have joined the audience for the requested movie is monitored and compared against a fourth attendance threshold indicative of the number of attendees necessary to achieve a fourth pricing tier (Price Tier 4). Once this fourth attendance threshold is reached, step 1620 is operative to set the ticket price to a fourth amount according to parameters of the fourth pricing tier. As in the case of the second and third pricing tier parameters used in steps 1612 and 1616, respectively, the amount that the ticket price is adjusted may be relative (e.g., a percentage) or absolute (e.g., a fixed dollar amount).

In step 1622 more users may join the audience until a maximum capacity of the movie screening venue has been reached, or some other criteria for determining when to close the audience curation (i.e., mobbing) period has been met, such as, for example, a timer. Once the curation process is complete, the movie screening begins in step 1624 for the registered/confirmed attendees. At this point, no further adjustments to the ticket price are made and the ticket price is set using the parameters corresponding to the highest pricing tier that has been achieved. In this regard, the methodology 1600 does not need to reach all four pricing tiers in order for the movie to begin. For example, if during the audience curation period only the attendance threshold corresponding to the second pricing tier is met, then the final ticket price is set to the second amount for the confirmed attendees, and the method 1600 jumps to step 1624, where the requested movie screening is started.

Optionally, as part of a gaming aspect of the CineMob management platform, the pricing methodology 1600 tracks which user(s) invited the most number of attendees in step 1626. If a given user does not have the most number of invited attendees, the user is charged the current ticket price in step 1628 (i.e., the ticket price associated with whatever pricing tier was reached). Alternatively, if the user is determined in step 1626 to have the most number of invited attendees, that user is designated as a "mob leader" in step 1630, and the user's ticket is free, or the user receives some other discount or credit to his or her account, in order to incentivize other users to invite friends and other individuals to join an audience relating to a movie screening request. Alternatively, the CineMob management platform may be configured to award the top ten (or some other number) users inviting the largest number of audience attendees with some further ticket price reduction, which may be scaled in order of ranking. Of course, as the number of attendees in the audience increases, all attendees will receive some benefit of a reduced ticket price.

It is to be appreciated that although the illustrative dynamic pricing methodology 1600 shown in FIG. 16 employs four different pricing tiers and corresponding tier parameters, embodiments of the invention are not limited to any specific number of pricing tiers; that is, fewer (e.g., two) or more (e.g., six) pricing tiers may be used to provide coarser or finer pricing adjustment levels, respectively, as will be understood by those skilled in the art.

The ability of the CineMob viewer-directed motion picture screening service to track the number of attendees invited by each user creates an opportunity to exploit gaming features provided by the service, according to one or more embodiments of the invention. By way of illustration only and without limitation, users can achieve a badge or other award for certain accomplishments within the CineMob service, including a badge for being a mob leader for a certain number of times within a prescribed period (e.g., mob leader of the week), or for attending a prescribed number of movie screening events within a set time period. Badges may be used by users to obtain credits to their accounts or other incentives (e.g., concession discounts, etc.). Leader names for certain categories can be broadcast by the service to other registered users. For example, CineMob users may opt to receive notifications indicating who the mob leaders are for specific movies, or who the daily mob leader or mob leader of the week is.

In one or more embodiments, the viewer-directed motion picture screening service is configured to encourage users to compete on social platforms, to challenge one another in various forms. For example, a user could post on a friend's timeline that they have been a mob leader for x number of times versus the friend's y number of times. The viewer-directed motion picture screening service may be further configured, in one or more embodiments, to offer games or other features within the application itself, thereby exploiting social integration features of the service, including the ability to chat with other CineMob users within the audience they have joined.

Figure 17:
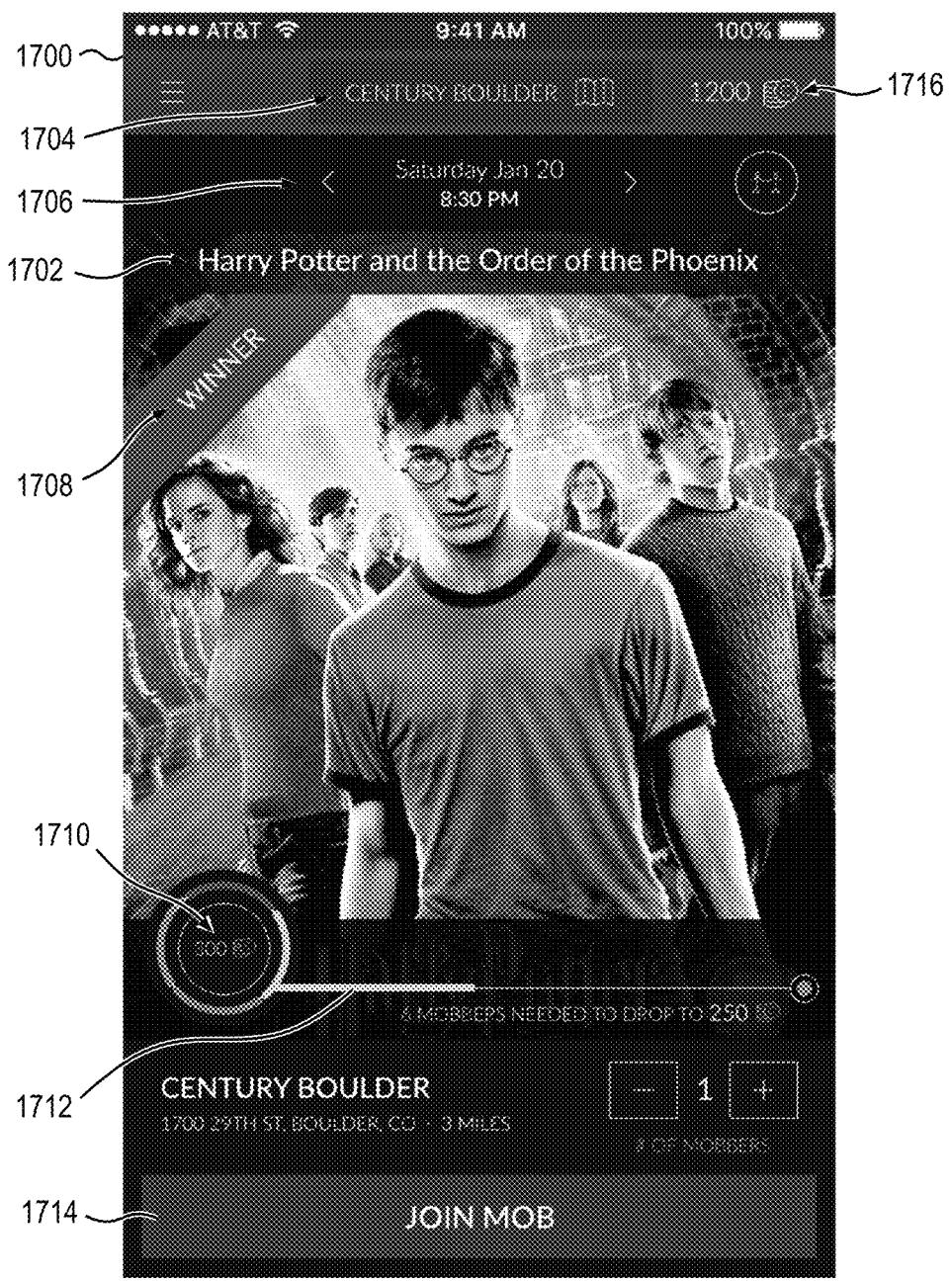
FIG. 17 is an exemplary screen shot depicting at least a portion of an audience curation page of the user-directed motion picture screening application program running on a mobile device, according to an embodiment of the invention.

With reference now to FIG. 17, an exemplary screen shot depicts at least a portion of an audience curation page 1700 of the user-directed motion picture screening application program running on a mobile device, according to an embodiment of the invention. In this embodiment, the audience curation page 1700 includes, among other displayed information, a title 1702 of a viewer-requested movie, a theater or other venue 1704 selected by the CineMob service to host the movie screening event, event date and time 1706, a notification banner 1708 indicating whether or not the requested movie event has been granted (e.g., based on the number of confirmed audience members reaching a prescribed threshold), a ticket price indicator 1710 indicating the current price of the ticket (in credits, dollars, or some other payment form) for the identified movie event based on the number of audience members presently confirmed to attend the event, and an audience curation progress bar 1712 indicating the number of movie attendees needed to reach a next pricing tier and a ticket price for the movie once that pricing tier has been reached. The progress bar 1712 is preferably updated on a real-time basis by the application program. The audience curation page 1700 also includes a "join mob" button 1714 which the user can select in order to join the audience for the indicated movie. The audience curation page 1700, like other pages displayed by the user-directed movie screening application program, preferably indicates the user's current account balance 1716 (in credits, dollars, or some other payment form). It is to be understood that the audience curation page 1700 is merely illustrative, and that embodiments of the invention contemplate various other ways to present information to the user regarding the status of audience curation relating to a particular movie or movies.

In one or more embodiments, the user-directed movie screening application program is configured to track the number of attendees of a given movie or movies invited by each of the users of the CineMob management platform. As a gaming feature of the application program, the user who has invited the most number of movie attendees for a given movie screening event is designated as a winner by the program for the given movie screening event, and that user is provided some reward as an incentive for generating the most number of audience members for the event. The reward may, for example, be in the form of a free ticket to the movie event, a reduced ticket price (e.g., a percentage of the current ticket price), an account credit, or some other incentive (e.g., priority seating, free or reduced movie concessions, etc.).

Figure 18:
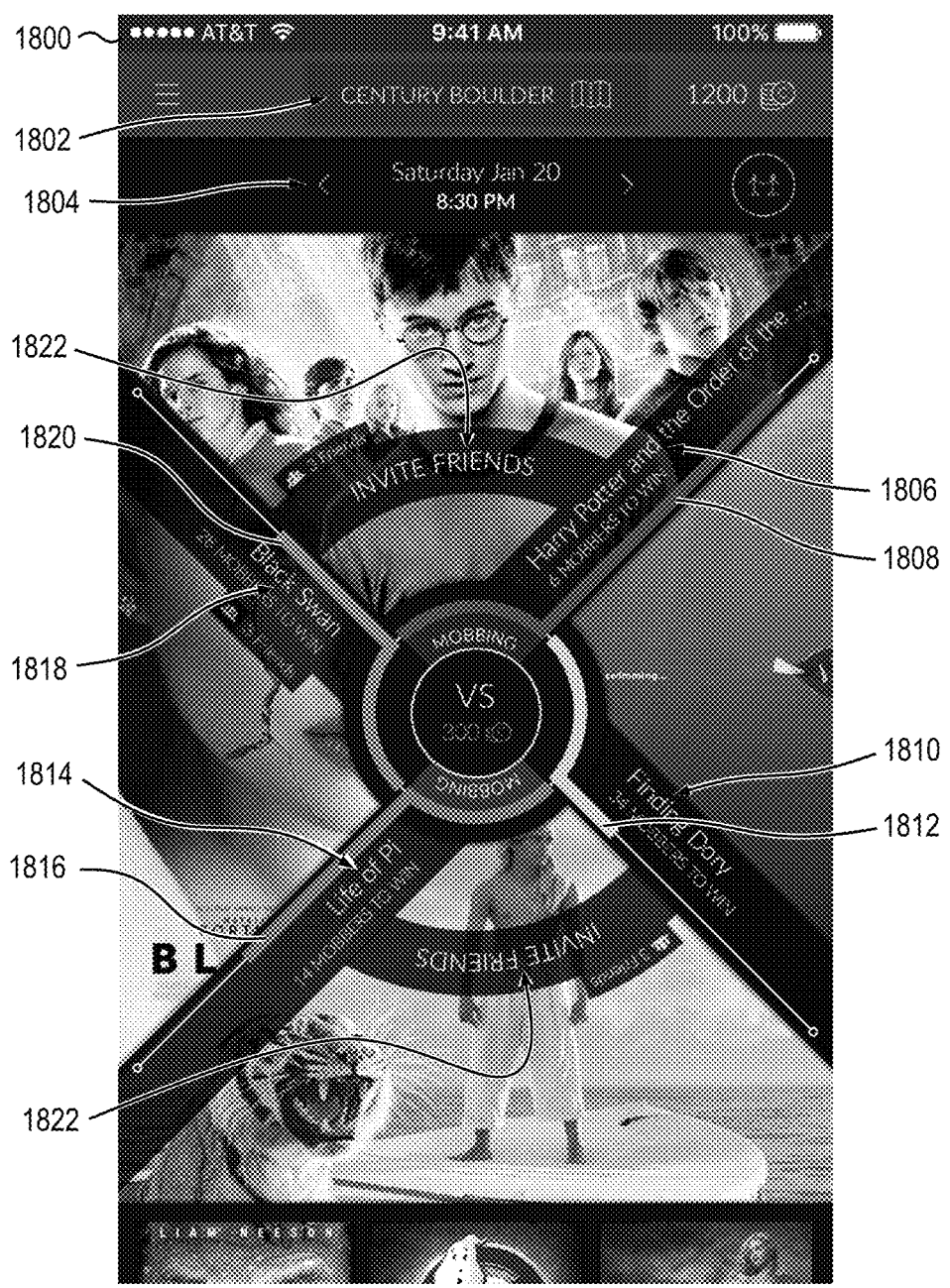
FIG. 18 is an exemplary screen shot depicting at least a portion of "versus" mode page of the user-directed motion picture screening application program running on a mobile device, according to an embodiment of the invention.

As another gaming aspect offered by the viewer-directed motion picture screening application program, in accordance with one or more embodiments, the CineMob management platform is configured in a "versus" mode, to display the audience curation progress of two or more movies competing for the same movie screening venue. By way of illustration only, FIG. 18 is an exemplary screen shot depicting at least a portion of a versus mode page 1800 of the user-directed movie screening application program running on the mobile device, according to an embodiment of the invention. The versus mode page 1800, in this embodiment, is configured to display four different requested movie screening events simultaneously competing for the same theater/venue, although it is to be appreciated that the invention is not limited to displaying any specific number of competing movies. For instance, the audience curation progress of a lesser number (e.g., two) or a greater number (e.g., five) of movies competing for a given hosting venue can be shown.

With reference to FIG. 18, the versus mode page 1800 of the movie screening application program includes a hosting venue identification area 1802 indicating the name (and possibly other information, such as an address) of the movie screening establishment, as well as the date and time 1804 of the requested movie screening event. The versus mode page 1800 further includes a title of a first viewer-requested movie 1806 and a corresponding first audience curation progress bar 1808, a title of a second viewer-requested movie 1810 and a corresponding second audience curation progress bar 1812, a title of a third viewer-requested movie 1814 and a corresponding third audience curation progress bar 1816, and a title of a fourth viewer-requested movie 1818 and a corresponding fourth audience curation progress bar 1820. In accordance with one or more aspects of the invention, the first movie to reach its prescribed audience curation threshold wins the screening event and is granted the movie screening at the corresponding hosting venue.

Embodiments of the invention contemplate various other arrangements of the information presented on the versus mode page 1800 of the movie screening application program, preferably in a manner which clearly indicates to the user a comparison of the audience curation progress for each or a subset of the competing movies. In one or more embodiments, the user may control how many competing movies are shown for a given event (e.g., by changing a parameter in the user's setting page or profile). In this example, the first movie title 1806 is the furthest along in meeting its prescribed threshold for granting the viewer-initiated movie request, requiring only six additional audience members, with the last-place movie being the second title 1810 which requires 34 additional audience members to meet its prescribed threshold. The required threshold number for each movie request to be granted need not be the same. The versus mode page 1800 may further include a selection button 1822 by which users can invite friends or other individuals to join the audience of a given one or more of the competing movies in an effort to facilitate the audience curation process.

Figure 19:
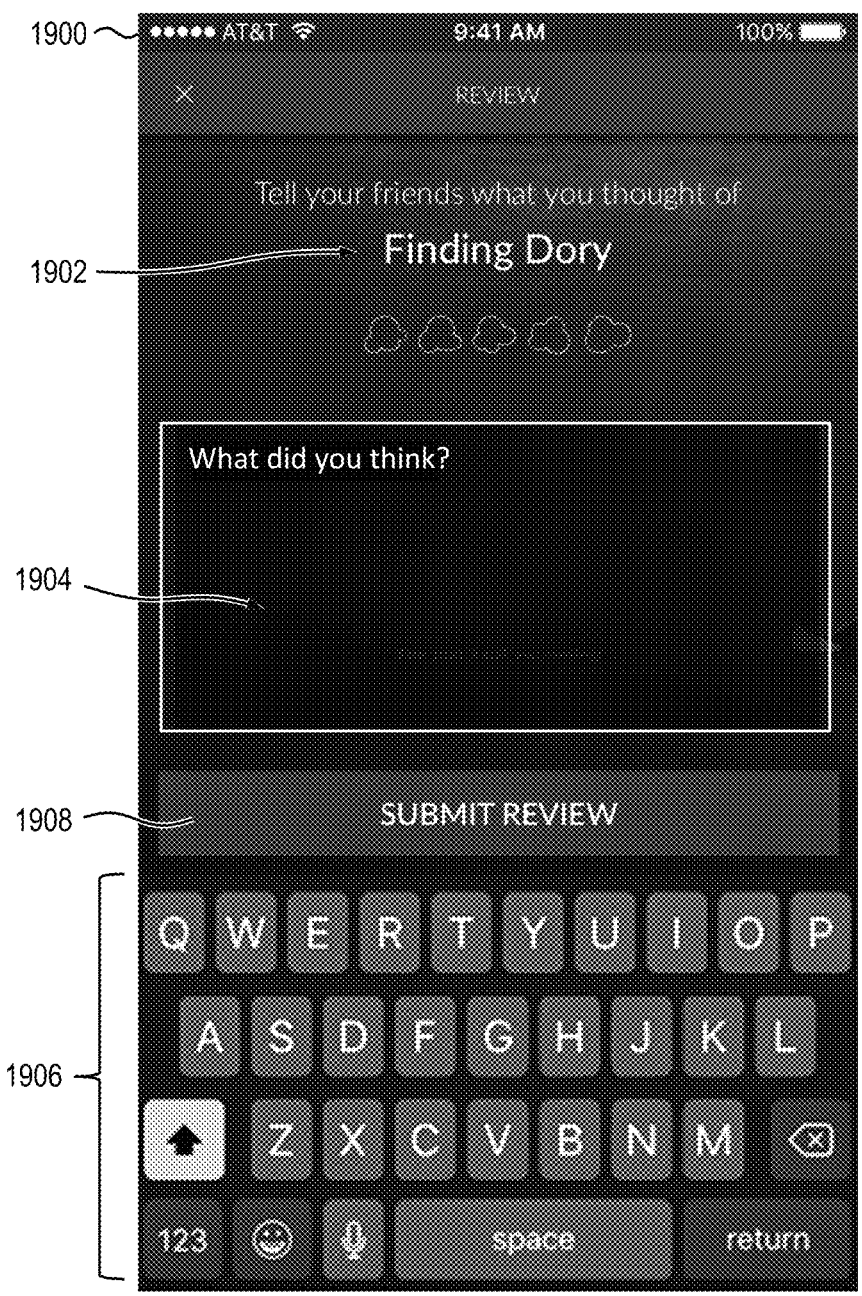
FIG. 19 is an exemplary screen shot depicting at least a portion of a movie review page of the user-directed motion picture screening application program running on a mobile device, according to an embodiment of the invention.

In one or more embodiments, the user-directed movie screening application program running on the mobile device is configured to receive input from users regarding whether or not they enjoyed the movie. FIG. 19 is an exemplary screen shot depicting at least a portion of movie review page 1900 of the user-directed motion picture screening application program, according to an embodiment of the invention. In this illustrative embodiment, the movie review page 1900 includes a title banner 1902 indicating the movie being reviewed, along with a text area 1904 where the user can enter a textual movie review, via a keyboard input area 1906 of the page, and a selection button 1908 for submitting the review. In other embodiments, the movie screening application program may present the user with a limited number of simple button selection choices (e.g., "Loved it!" or "Hated it!") on the movie review page 1900, whereby users can quickly express how they feel about a movie that has just finished, or viewers may opt to send emojis, ideograms, or other visual or audible indicators best describing their reactions to the movie. Rather than selecting canned button choices or entering a textual or ideogram reviews, users can alternatively take a photo (i.e., "selfie") of their reaction to a movie as the movie ends, in one or more embodiments. Immediate feedback from a viewer is one of the best ways to gauge the viewer's emotional response to a given movie that has just ended.

As part of the movie review features of the user-directed movie screening application program, users of the CineMob management platform may be asked to provide reviews of first-run movies and receive in-app incentives for doing so (e.g., account credits, free or reduced-price movie tickets and/or concessions, etc.). Frequent reviewers may be awarded special status by the CineMob system, such as, for example, priority seating. This data is used by the CineMob management platform, in one or more embodiments, as a means of providing valuable information to movie studios, and gives the CineMob system insight into which movies might be popular for subsequent audience curation; that is, the CineMob system may choose to suggest certain movies for audience curation, once they come of their first runs, to system users based on favorable reviews from other users.

In traditional first-run movie screenings, trailers are often shown to audiences waiting for the movie to start. These trailers advertise movies that will be released as first-run movies in the future. In a similar manner, the time during which audience members are waiting for their requested movie screening event to start can be used to advertise movies for which the CineMob service is presently curating audiences (i.e., movies currently mobbing). Additionally, the CineMob service may present trailers of suggested movies for which users may want to initiate movie screening requests.

In one or more embodiments, during the time audience members are waiting for the movie to begin, the CineMob management platform utilizes social integration functionality to provide audience members with interactive content on-screen, such as, for example, trivia games, group games (e.g., Just Dance®, a registered trademark of Ubisoft Entertainment Corp.), selfie postings, tweets, text messages to other audience members, movie reviews, voting (e.g., on music or movies), targeted movie trailers, etc., as well as presenting a listing of viewer-requested movies that are currently in the audience curation process through the CineMob platform. This feature not only helps pass time in an enjoyable manner while waiting for the movie to start, but it can also provide valuable information to users. The CineMob platform can also be used, in one or more embodiments, to chat with other CineMob users, such as audience members of a movie they are currently attending, within the movie screening application program itself.

In one or more embodiments, the user-directed movie screening application program running on a mobile device is configured to provide location-aware features to users by utilizing beacons and/or other positioning hardware (e.g., geofencing) for identifying a user's location and performing prescribed actions in response thereto. Beacons and geofencing both seek to identify a user's proximity to a particular location; geofencing uses global positioning system (GPS) coordinates to encapsulate an area and takes the user's position (latitude and longitude) to determine whether or not the user is within the encapsulated area, whereas beacons utilize Bluetooth® (a registered trademark of Bluetooth SIG, Inc.), Bluetooth® Low Energy (BLE), or another communication protocol, to estimate a user's proximity to the beacon. Geofencing is coarser in its location accuracy compared to using beacons. For example, a user's friends, using the geofencing features of the CineMob management platform, could be notified that they have arrived at a theater hosting a selected movie screening event.

By placing beacons throughout a theater or other venue, users can be provided experience enhancements, using location-aware features of the CineMob management platform, while navigating throughout the theater. Each beacon sends out a unique identification signal which is received by the user's mobile device, and the CineMob application program running on the mobile device initiates some action in response thereto. For example, a user walks up to a concession area of a theater having a beacon placed nearby and is offered a promotion for a concession discount, or users walking past a theater may receive a notification that a mob is upcoming at the theater.

Figure 20:
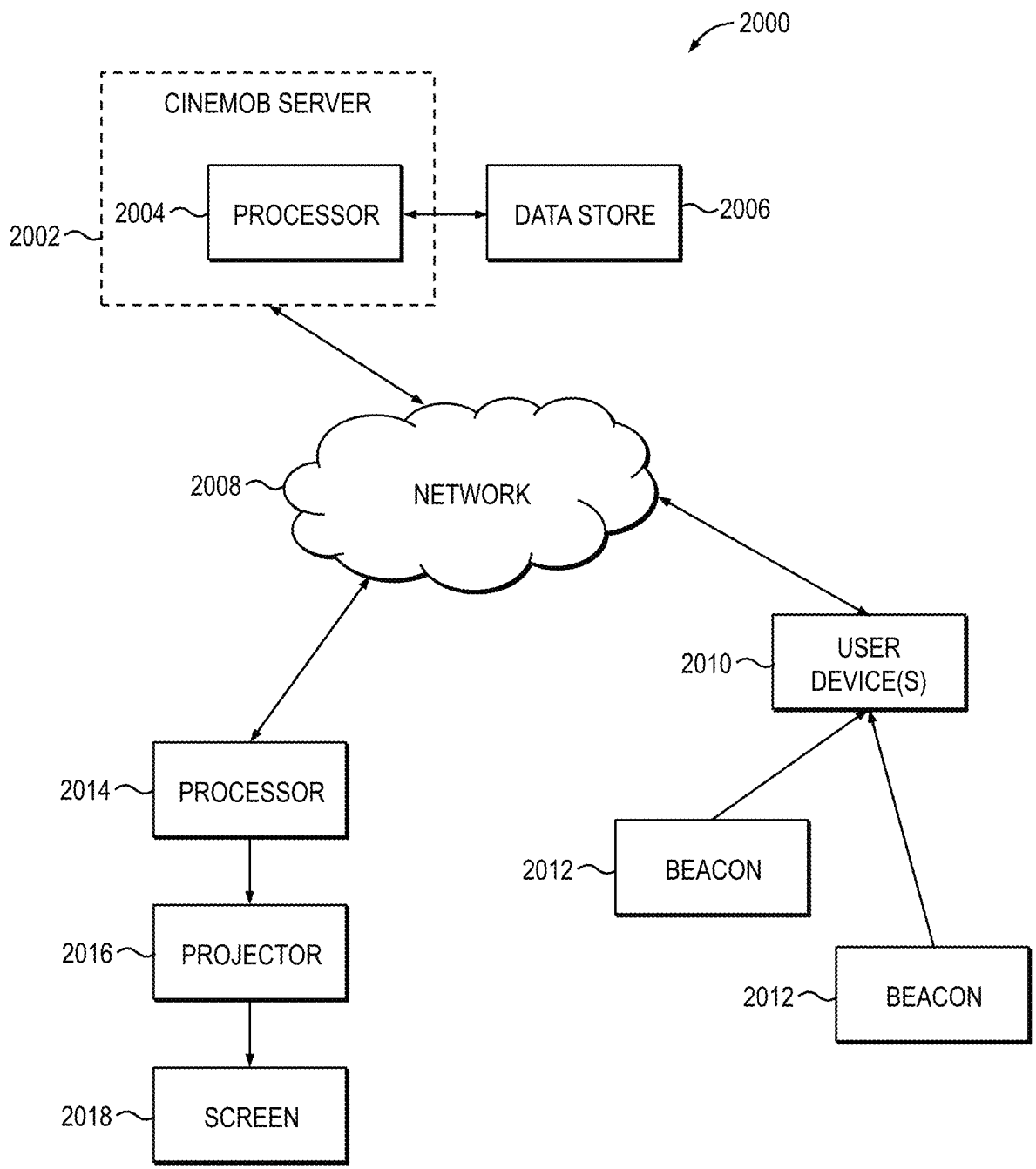
FIG. 20 is a block diagram depicting at least a portion of an exemplary system for providing location-aware enhancements to a user-directed movie screening application, according to an embodiment of the invention.

FIG. 20 is a block diagram depicting at least a portion of an exemplary system 2000 for providing location-aware enhancements to a user-directed motion picture screening application, according to an embodiment of the invention. The system 2000 includes a server (CineMob server) 2002 comprising at least a first processor 2004 configured to execute at least a portion of a location-aware program for providing location-aware enhancements to the user. The processor 2004 is in operative connection with a data store 2006, or alternative storage element, for storing data used by the processor in running the location-aware program. The data store 2006 may reside externally to the server 2002 as shown. In one or more other embodiments, the data store 2006 may be integrated with the server 2002. The server 2002 is configured to communicate, through a network 2008 (e.g., Internet) or other communications medium (e.g., wireless local area network (WLAN)), with one or more user devices 2010 (e.g., smart phone, tablet, etc.). In this example, both the server 2002 and user device(s) 2010 are operatively coupled with the network 2008.

The system 2000 further includes one or more beacons 2012 (e.g., Kontakt™ beacon) using a standard communication protocol (e.g., Eddystone®, Google Inc.; or iBeacon®, Apple Inc.) or proprietary communication protocol. The beacons 2012 are placed at various points throughout the interior and/or exterior of a theater or venue. As previously stated, each of the beacons 2012 broadcasts a unique identification signal which is then received by the user device(s) 2010, which translates the received signal into a location value which varies as a function of the proximity of the user device to the beacon; the strength of the signal received by the user device is indicative of the relative proximity of the user device to the beacon. This proximity information is used by location-aware features of the application program running on the user device to control one or more actions. Specifically, the user-directed motion picture screening application program running on the user device 2010 is configured to initiate one or more actions in response to receipt of the particular beacon signal. For example, a beacon 2012 placed in the concession area of a theater may be used to cause the motion picture screening application program to send a targeted advertisement or promotional notification (e.g., discount coupons for food or drink items) to the user device 2010. Likewise, a beacon 2012 placed just outside the main entrance of the theater may be used to send notifications to a user device 2010 outside the theater to inform a user walking by the theater of an upcoming viewer-requested movie screening event which the user can join. Likewise, a beacon 2012 placed inside a given room of the theater may cause a user's device 2010 to send notifications to friends who are also in the given room attending the movie screening event indicating that the user has arrived.

The system 2000 further includes at least a second processor 2014, which, in this embodiment, resides in (or is otherwise associated with) the theater or movie screening venue, a projector 2016 operatively connected to the processor 2014, and a screen 2018 for displaying content generated by the projector. The processor 2014 residing in the theater is operatively coupled with the network 2008 and is configured to communicate, through the network, with the CineMob server 2002. In this manner, the server 2002 will communicate with the processor 2014 for updating content projected (by projector 2016) on the screen 2018. Thus, in one or more embodiments, the CineMob server 2002 is adapted to control aspects of the motion picture screening event, including streaming digital content, starting and stopping the movie, displaying messages, trailers, ads, etc., through the network 2008 to be displayed on the screen 2018.

In one or more embodiments, for implementing an interactive session between audience members of a given movie screening event in the theater (e.g., trivia game, voting, etc.), the user devices 2010 will communicate, through the network 2008, with the CineMob server 2002, and the server 2002 will then communicate with the theater processor 2014, again through the network, to update content on the screen 2018. Alternatively, in another embodiment, the user-directed motion picture screening application is configured such that user devices 2010 communicate directly with the theater processor 2014 to directly control the content displayed on the screen 2018 by the projector 2016.

In one or more embodiments, the audience curation functionality of the CineMob user-directed motion picture screening service can be used in a multi-purpose manner to not merely curate audiences for user-requested movie screenings, but to also generate a source of investment funds, such as in a crowd-funding application, and to test (e.g., beta test) the CineMob management platform to thereby help improve one or more aspects of the invention.

Mobile Movie Screening Venue Embodiment

As previously stated, one or more embodiments of the invention may provide a mobile theater functionality, whereby one or more mobile theaters are dispatched to a location(s) selected by the viewer(s) or by the CineMob service for screening a viewer-directed movie. This feature is particularly advantageous where a theater or other screening venue having a fixed physical address is not located within a prescribed distance of the curated audience for a given viewer-directed movie screening event.

With reference again to FIG. 3, in order to implement a mobile theater functionality, the exemplary method 300 for implementing the user-directed motion picture screening service is configured to perform certain actions relating to the mobile theater feature, according to one or more embodiments of the invention. For example, step 312 which involves sending a notification to confirmed viewers of the curated audience for the given viewer-directed movie screening event indicating the location, date and time of the movie showing, can be adapted to accommodate the mobile theater option.

Figure 21:
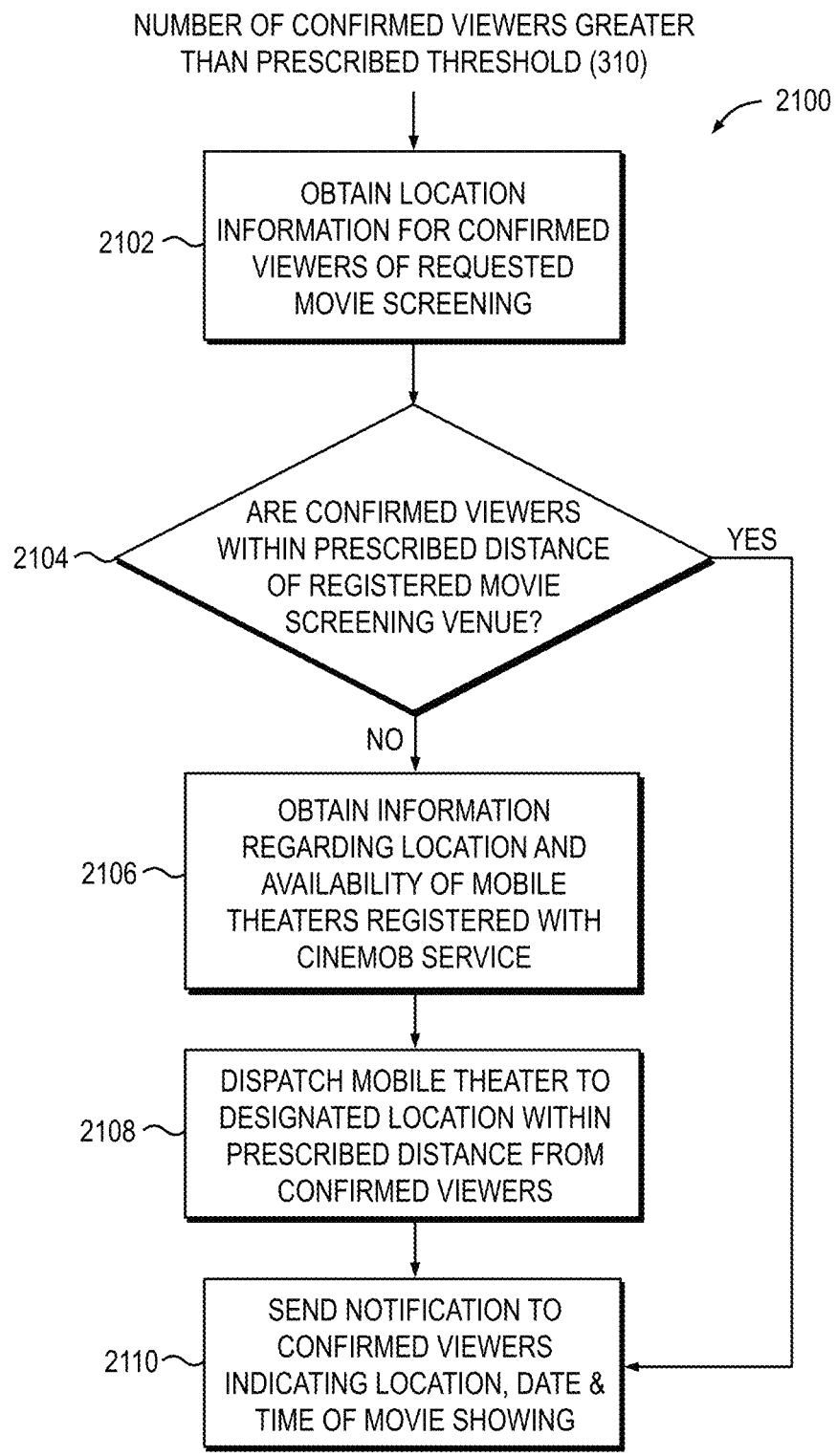
FIG. 21 is a flow diagram depicting an exemplary method for implementing a mobile cinema feature in the user-directed motion picture screening system, according to an embodiment of the invention.

Specifically, FIG. 21 is a flow diagram depicting an exemplary method 2100 for implementing a mobile theater feature in the CineMob viewer-directed motion picture screening service, according to an embodiment of the invention. The method 2100 is preferably implemented as part of step 312 in the illustrative method 300 shown in FIG. 3, although at least a portion of the method 2100 may be implemented in a functional step that is distinct from step 312.

With reference to FIG. 21, the method 2100, once the CineMob management platform determines that the number of confirmed viewers exceeds the prescribed threshold so as to proceed with the viewer-directed movie screening event (e.g., step 310 in FIG. 3), the CineMob management platform obtains location information associated with the confirmed viewers in step 2102. This location information may be received by the CineMob management platform in the form of a physical address entered into the CineMob system by each viewer (e.g., when the viewer registers with the CineMob service) or, more preferably, as GPS coordinate data from the viewers' mobile devices or other viewer location tracking mechanism. This location information is used by the CineMob service to help determine the location of a suitable movie screening venue for the viewer-directed movie screening.

For example, in step 2104 the CineMob management platform compares the respective locations of the confirmed viewers with a listing of movie screening venues registered with the CineMob service to determine whether there is a movie screening venue having a fixed physical address that is within a prescribed distance from the viewers. The prescribed distance, in one or more embodiments, may be a number (e.g., miles, feet, etc.) entered by each of the registered viewers as part of their viewer profile indicating how far the viewer is willing to travel to attend a movie screening event. In one or more other embodiments, the prescribed distance may be established by the CineMob management platform based on certain criteria, such as, for example, the relative proximity of the confirmed viewers to one another (e.g., a size of a cluster encompassing all the confirmed viewers for the given movie screening).

If there are no fixed-address screening venues within the prescribed distance of the confirmed viewers, the CineMob management platform, in step 2106, obtains information regarding the location and availability of mobile theaters registered with the CineMob service. As previously stated, mobile theater location information can be obtained using any suitable vehicle tracking mechanism (e.g., GPS tracking, dispatcher, etc.). Likewise, information regarding the availability of a mobile theater can be obtained, for example, by interrogating each mobile theater and having the mobile theater send a notification signal or other message to the CineMob management platform in response indicating the current status of the mobile theater (e.g., "available" or "in use"). Alternatively, in one or more embodiments, rather than having the CineMob system interrogate each mobile theater, the mobile theaters may periodically broadcast their availability status, possible along with location data, to the CineMob management platform.

In step 2108, the CineMob management platform selects a location (e.g., parking lot, etc.) that is preferably centralized to the collective plurality of confirmed viewers, or is at least within the prescribed distance from each of the confirmed viewers. An available mobile theater that is preferably closest in proximity is then dispatched to that selected location. A notification is then sent by the CineMob management platform to the confirmed viewers of the movie screening event regarding the location of the movie screening venue, along with the movie time and any other relevant information.

Alternatively, if the CineMob management platform determines in step 2104 that there is a movie screening venue having a fixed physical address that is within the prescribed distance of the confirmed viewers, the CineMob management platform selects that movie screening venue and proceeds to step 2108 to notify the confirmed viewers of the location, time, etc., of the movie screening venue.

Figure 22:
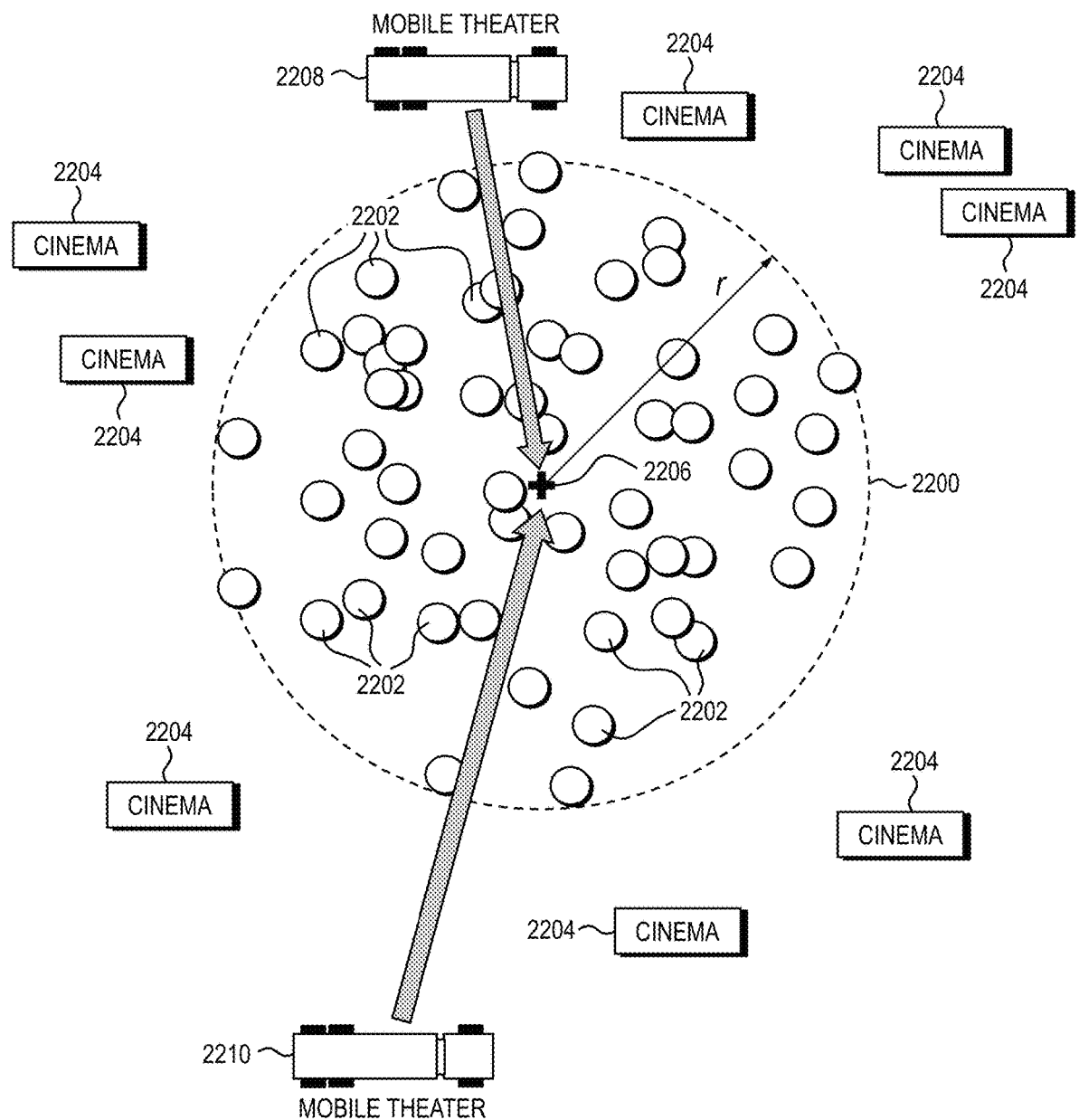
FIG. 22 is a diagram conceptually depicting an illustrative methodology used by the user-directed motion picture screening system to determine a location for the motion picture screening venue, according to an embodiment of the invention.

By way of example only and without limitation, FIG. 22 conceptually depicts an illustrative methodology used by the CineMob management platform to determine a location of the movie screening venue, according to an embodiment of the invention. As shown in FIG. 22, the CineMob management platform preferably defines a boundary 2200 around the plurality of confirmed viewers 2202. Although the boundary 2200 is depicted in this example as a circle, it is to be appreciated that embodiments of the invention are not limited to any particular shape or size of the boundary encompassing the confirmed viewers 2202 of the viewer-directed movie screening event.

In this example, there are no cinemas 2204 or other movie screening facilities having a fixed address within the boundary 2200 encompassing the collective plurality of confirmed viewers 2202. Thus, the CineMob management platform selects a location 2206 which is preferably approximately centralized with respect to the boundary 2200, such as a distance, r, from the selected location 2206 to any point on the boundary. Other schemes for choosing a location that is within the boundary 2200 of confirmed viewers 2202 are contemplated such that each viewer 2202 is within his or her corresponding maximum distance to the movie screening venue.

Since there are no cinemas 2204 having a fixed address that is within the boundary 2200 encompassing the confirmed viewers 2202, the CineMob management platform is adapted to obtain location information corresponding to available mobile theaters, 2208 and 2210, and dispatches one of the mobile theaters, preferably mobile theater 2208 which is closer to the selected venue location 2206 compared to mobile theater 2210, where a temporary movie screening facility can be established for the confirmed viewers 2202. Once the mobile theater 2208 is set up at the selected location 2206, a notification is preferably sent by the mobile theater 2208 to the CineMob management platform indicating that the mobile theater 2208 is in use and unavailable for dispatch.

Suitable mobile theaters for use in conjunction with embodiments of the invention include vehicles which include their own engines or other means of self-movement, such as trucks (e.g., Xindy Animation Technology Co., Ltd., Guangzhou, China), and those without means for self-movement, such as trailers (e.g., Screen Machine and Screen Machine 2, Regional Screen Scotland, United Kingdom, or Mobile Cinema Solutions, Inc., Weston, Fla.).

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 15:
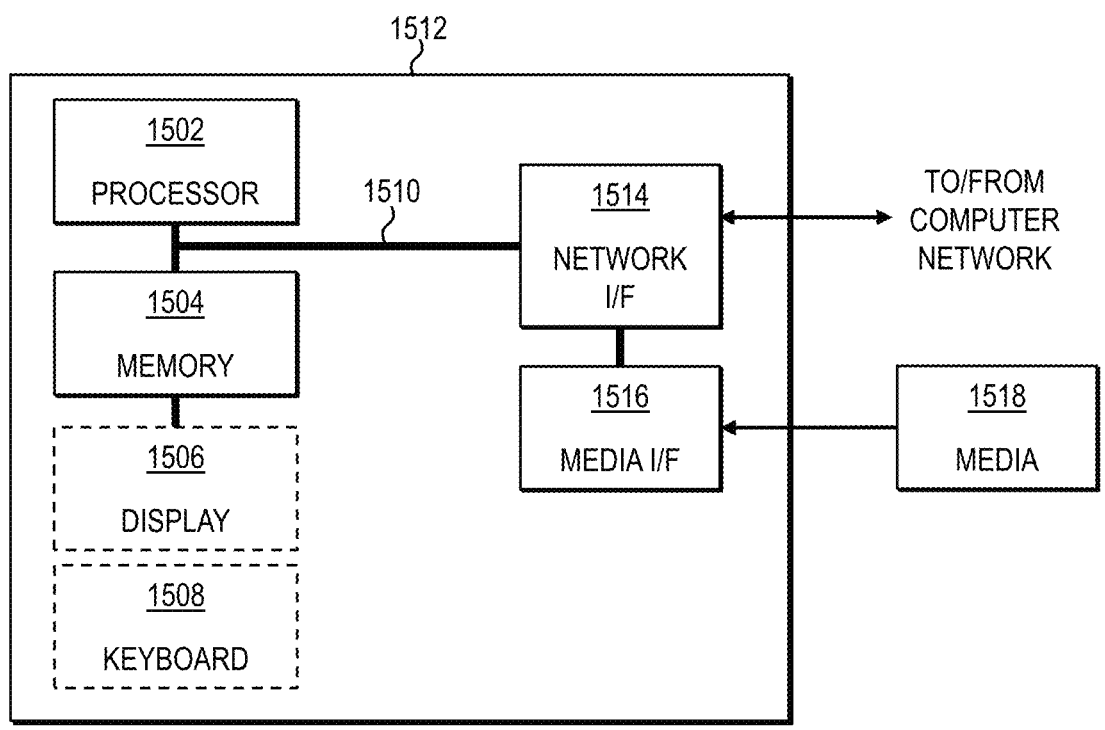
FIG. 15 is a block diagram depicting at least a portion of an exemplary computer system that may be useful in implementing one or more aspects and/or elements of the invention.

One or more embodiments can make use of software running on a general purpose computer or workstation which, when configured to implement methodologies in accordance with aspects of the invention, will become a special purpose apparatus. With reference to FIG. 15, such an implementation might employ, for example, a processor 1502, a memory 1504, and an input/output interface formed, for example, by a display 1506 and a keyboard 1508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1502, memory 1504, and input/output interface such as display 1506 and keyboard 1508 can be interconnected, for example, via a bus 1510 as part of a data processing unit 1512. Suitable interconnections, for example via bus 1510, can also be provided to a network interface 1514, such as a network interface card (NIC) or other interface circuitry, which can be provided to interface with a computer network, and to a media interface 1516, such as a CD-ROM or flash drive, which can be provided to interface with media 1518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1502 coupled directly or indirectly to memory elements 1504 through a system bus 1510. The memory elements can include local memory employed during actual implementation of the program code, bulk storage, and cache memories, among other memory elements, which provide temporary storage of at least some program code in order to reduce the number of times code must be retrieved from bulk storage during implementation.

Input/output or I/O devices (including, but not limited to, keyboards 1508, displays 1506, pointing devices, and the like) can be coupled to the system either directly (such as via bus 1510) or through intervening I/O controllers (omitted for clarity).

Network adapters such as network interface 1514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1512 as shown in FIG. 15) running a server program. It will be understood that such a physical server may or may not include a display and keyboard.

As noted, aspects of the present invention may take the form of a computer program product embodied in one or more non-transient computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations, exemplary mobile device screen shots and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to one or more embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a CineMob management platform (108 in FIG. 1). The method steps can then be carried out using the distinct software modules and/or sub-modules of the system, as described above, executing on one or more hardware processors 1502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The embodiments of the invention described herein are intended to provide a general understanding of the various embodiments, and are not intended to serve as a complete description of all the elements and features of apparatus and systems that might make use of the structures described herein. Other embodiments will become apparent to those skilled in the art given the teachings herein; other embodiments are utilized and derived therefrom, such that structural and logical substitutions and changes can be made without departing from the scope of this disclosure. The drawings are also merely representational and are not drawn to scale. Accordingly, the specification and drawings are to be regarded in an illustrative rather than in a restrictive sense.

Embodiments of the invention are referred to herein, individually and/or collectively, by the term "embodiment" merely for convenience and without intending to limit the scope of this application to any single embodiment or inventive concept if more than one is, in fact, shown. Thus, although specific embodiments have been illustrated and described herein, it should be understood that an arrangement achieving the same purpose can be substituted for the specific embodiment(s) shown; that is, this disclosure is intended to cover any and all adaptations or variations of various embodiments. Combinations of the above embodiments, and other embodiments not specifically described herein, will become apparent to those of skill in the art given the teachings herein.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the appended claims reflect, inventive subject matter lies in less than all features of a single embodiment. Thus the following claims are hereby incorporated into the Detailed Description, with each claim standing on its own as separately claimed subject matter.

Given the teachings of embodiments of the invention provided herein, one of ordinary skill in the art will be able to contemplate other embodiments of the invention. Although embodiments of the invention have been described herein with reference to the accompanying drawings, it is to be understood that embodiments of the invention are not limited to the described embodiments, and that various other embodiments within the scope of the following claims will be apparent to those skilled in the art given the teachings herein.

What is claimed is:

1. A method for implementing a viewer-directed motion picture screening service, the method being performed by one or more processors and comprising:
   communicating, via one or more wireless networks, with a user application executing on mobile computing devices of a plurality of viewers and at least one motion picture screening facility using the viewer-directed motion picture screening service;
       enrolling, via the one or more wireless networks, the plurality of viewers and the at least one motion picture screening facility in the viewer-directed motion picture screening service, via a management module executing on the one or more processors;
   sending, over the one or more wireless networks, a request for screening a given motion picture from the user application executing on a mobile computing device of a requesting viewer of the plurality of viewers, to the management module;
   the management module communicating with the user application executing on mobile computing devices of the plurality of viewers via the one or more wireless networks to automatically curate an audience including a subset of the plurality of viewers who have indicated an intent to screen the given motion picture;
   wherein the management module automatically curates the audience by pushing notifications regarding an active viewer-requested motion picture screening, via the one or more wireless networks, to at least a subset of the plurality of viewers enrolled with the viewer-directed motion picture screening service, and presenting a user-selectable button displayed on the mobile computing devices of the plurality of viewers through which an interested viewer sends, to the management module, an indication of intent to join the audience for a given viewer-directed motion picture screening event;
   the management module providing real-time status updates regarding a progress of audience curation for display on the mobile computing devices of the plurality of viewers in a format selectable by the viewers;
   granting, by the management module, the request for screening the given motion picture when the curated audience has reached a prescribed minimum number;
   receiving, via the one or more wireless networks, on the mobile computing device of the requesting viewer a notification from the management module regarding a status of the request for screening the given motion picture;
   obtaining location information, via the one or more wireless networks, from a global positioning system (GPS) component of the mobile computing devices of a subset of the plurality of viewers who have indicated an intent to screen the given motion picture;
   obtaining location information, from a GPS tracking mechanism of each of at least a subset of a plurality of mobile motion picture screening units enrolled in the viewer-directed motion picture screening service and status information via the one or more wireless networks of each of the at least a subset of the plurality of mobile motion picture screening units;
   determining, by the management module, that the curated audience has reached a prescribed minimum number and that the request for screening the given motion picture is granted;
   when the notification from the management module indicates that the request for screening the given motion picture has been granted, determining, using the location information obtained from the subset of the plurality of viewers, whether the at least one motion picture screening facility is located within a prescribed distance of the subset of the plurality of viewers who have indicated an intent to screen the given motion picture;
   determining, by the management module, that the at least one motion picture screening facility is located outside of the prescribed distance of the subset of the plurality of viewers who have indicted an intent to screen the given motion picture;
   when the at least one motion picture screening facility is located outside the prescribed distance, dispatching an available mobile motion picture screening unit having a location that is closest to a given location relative to other mobile motion picture screening units in the subset of the plurality of mobile motion picture screening units, determined based on the obtained location information and status information of each of the at least a subset of the plurality of mobile motion picture screening units, wherein the given location is within the prescribed distance of said subset of the plurality of viewers; and
   when the notification from the management module indicates that the request for screening the given motion picture has been granted, sending, via the one or more wireless networks, information for display on the mobile computing devices of said subset of the plurality of viewers indicating at least one of a date, time and location of the viewer-directed motion picture screening event established by the management module for viewing the given motion picture.

2. The method of claim 1, wherein dispatching the mobile motion picture screening unit comprises obtaining information regarding at least one of a location and availability of each of at least a subset of a plurality of mobile motion picture screening units enrolled in the viewer-directed motion picture screening service.

3. The method of claim 2, wherein location information corresponding to each of at least the subset of the plurality of mobile motion picture screening units is obtained using a vehicle tracking mechanism associated with each of said subset of the plurality of mobile motion picture screening units.

4. The method of claim 2, wherein location information corresponding to each of at least the subset of the plurality of mobile motion picture screening units comprises global positioning system data.

5. The method of claim 1, wherein location information from each given viewer of said subset of the plurality of viewers comprises an address entered into the viewer-directed motion picture screening service by the given viewer.

6. The method of claim 1, further comprising sending a notification to the management module by the mobile motion picture screening unit indicating that the mobile motion picture screening unit is in use and unavailable for dispatch.

7. The method of claim 1, wherein the step of curating comprises:
receiving, by the management module, confirmations from each of the respective plurality of viewers who have indicated an intent to screen the given motion picture;
tracking a number of confirmations received from the plurality of viewers who have indicated an intent to screen the given motion picture;
comparing the number of confirmations with the prescribed minimum number of viewers;
and indicating to the management module when the number of confirmations is at least equal to the prescribed minimum number of viewers.

8. The method of claim 1, wherein the step of curating comprises establishing, by the management module, a time period for assembling an audience including the prescribed minimum number of viewers for screening the given motion picture.

9. The method of claim 1, wherein the step of enrolling the plurality of viewers and the at least one motion picture screening facility comprises obtaining, by the management module, prescribed information corresponding to the plurality of viewers and the at least one motion picture screening facility.

10. The method of claim 9, wherein at least a portion of the prescribed information obtained by the management module from each of at least a subset of the plurality of viewers comprises personal preference information configured to control a manner in which information from the viewer-directed motion picture screening service is presented to said subset of the plurality of viewers.

11. The method of claim 9, wherein at least a portion of the prescribed information obtained by the management module from each of at least a subset of the plurality of viewers comprises a maximum distance the viewer is willing to travel to attend a given viewer-directed motion picture screening event.

12. The method of claim 1, further comprising:
executing a gaming application on the one or more processors, the gaming application being configured to track a number of attendees in an audience for the motion picture screening event invited to join the motion picture screening event by each of at least a subset of the plurality of viewers enrolled with the viewer-directed motion picture screening service; and
designating, by the gaming application, at least a given one of the viewers as a winner of the gaming application as a function of the given one of the viewers having invited a prescribed number of attendees in the audience for the motion picture screening event.

13. The method of claim 1, further comprising storing, in a memory coupled with the management module, data relating to at least a given one of the plurality of viewers, said data comprising at least one of user preferences for controlling a manner in which information is presented to the given one of the plurality of viewers, and identification information for uniquely identifying the given one of the plurality of viewers to the motion picture screening service.

14. The method of claim 1, further comprising providing real-time status updates for display on the mobile computing devices of the plurality of viewers regarding the progress of audience curation for at least two viewer-directed motion picture screening events, the real-time status updates regarding the progress of audience curation for the at least two viewer-directed motion picture screening events being displayed concurrently and in a format selectable by the respective viewers.

15. An apparatus for implementing a viewer-directed motion picture screening service, the apparatus comprising:
a memory;
at least one processor coupled with the memory; and
a management module executing on the at least one processor and configured:
to communicate, via one or more wireless networks, with a user application executing on mobile computing devices of a plurality of viewers and at least one motion picture screening facility using the viewer-directed motion picture screening service;
to enroll, via the one or more wireless networks, the plurality of viewers and at least one motion picture screening facility in the viewer-directed motion picture screening service;
to receive, via the one or more wireless networks, a request for screening a given motion picture from the user application executing on a mobile computing device of a requesting viewer of the plurality of viewers;
to communicate with the user application executing on mobile computing devices of the plurality of viewers via the one or more wireless networks to automatically curate an audience including a subset of the plurality of viewers who have indicated an intent to screen the given motion picture;
to automatically curate the audience by pushing notifications regarding an active viewer-requested motion picture screening, via the one or more wireless networks, to at least a subset of the plurality of viewers enrolled with the viewer-directed motion picture screening service, and presenting a user-selectable button displayed on the mobile computing devices of the plurality of viewers through which an interested viewer sends, to the management module, an indication of intent to join the audience for a given viewer-directed motion picture screening event;
to provide real-time status updates regarding a progress of audience curation for display on the mobile computing devices of the plurality of viewers in a format selectable by the viewers;

to send a notification to the requesting viewer regarding a status of the request for screening the given motion picture;

to obtain location information, via the one or more wireless networks, from a global positioning system (GPS) component of the mobile computing devices of a subset of the plurality of viewers who have indicated an intent to screen the given motion picture;

to obtain location information, from a GPS tracking mechanism of each of at least a subset of a plurality of mobile motion picture screening units enrolled in the viewer-directed motion picture screening service, and status information, via the one or more wireless networks, of each of the at least a subset of the plurality of mobile motion picture screening units;

when the notification indicates that the request for screening the given motion picture has been granted, to determine, using the location information obtained from the subset of the plurality of viewers, whether the at least one motion picture screening facility is located within a prescribed distance of the subset of the plurality of viewers who have indicated an intent to screen the given motion picture;

when the at least one motion picture screening facility is located outside the prescribed distance, to dispatch an available mobile motion picture screening unit having a location that is closest to a given location relative to other mobile motion picture screening units in the subset of the plurality of mobile motion picture screening units, determined based on the obtained location information and status information of each of the at least a subset of the plurality of mobile motion picture screening units, wherein the given location is within the prescribed distance of said subset of the plurality of viewers; and when the notification from the management module indicates that the request for screening the given motion picture has been granted, to send, via the one or more wireless networks, information for display on the mobile computing devices of said subset of the plurality of viewers indicating at least one of a date, time and location of the viewer-directed motion picture screening event established by the management module for viewing the given motion picture.

16. The apparatus of claim 15, wherein the management module is configured to provide real-time status updates for display on the mobile computing devices of the plurality of viewers regarding the progress of audience curation for at least two viewer-directed motion picture screening events, the real-time status updates regarding the progress of audience curation for the at least two viewer-directed motion picture screening events being displayed concurrently and in a format selectable by the respective viewers.

17. A computer program product, the computer program product comprising a non-transitory computer readable storage medium having computer readable program code embodied thereon for implementing a viewer-directed motion picture screening service, the computer readable program code, when executed on at least one processor, causing the at least one processor:

to communicate, via one or more wireless networks, with a user application executing on mobile computing devices of a plurality of viewers and at least one motion picture screening facility using the viewer-directed motion picture screening service;

to enroll, via the one or more wireless networks, the plurality of viewers and at least one motion picture screening facility in the viewer-directed motion picture screening service;

to receive, via the one or more wireless networks, a request for screening a given motion picture from the user application executing on a mobile computing device of a requesting viewer of the plurality of viewers;

to communicate with the user application executing on mobile computing devices of the plurality of viewers via the one or more wireless networks to automatically curate an audience including a subset of the plurality of viewers who have indicated an intent to screen the given motion picture;

to automatically curate the audience by pushing notifications regarding an active viewer-requested motion picture screening, via the one or more wireless networks, to at least a subset of the plurality of viewers enrolled with the viewer-directed motion picture screening service, and presenting a user-selectable button displayed on the mobile computing devices of the plurality of viewers through which an interested viewer sends, to the at least one processor, an indication of intent to join the audience for a given viewer-directed motion picture screening event;

to provide real-time status updates regarding a progress of audience curation for display on the mobile computing devices of the plurality of viewers in a format selectable by the viewers;

to send a notification to the requesting viewer regarding a status of the request for screening the given motion picture;

to obtain location information, via the one or more wireless networks, from a global positioning system (GPS) component of the mobile computing devices of a subset of the plurality of viewers who have indicated an intent to screen the given motion picture;

to obtain location information, from a GFS tracking mechanism of each of at least a subset of a plurality of mobile motion picture screening units enrolled in the viewer-directed motion picture screening service, and status information, via the one or more wireless networks, of each of the at least a subset of the plurality of mobile motion picture screening units;

when the notification indicates that the request for screening the given motion picture has been granted, to determine, using the location information obtained from the subset of the plurality of viewers, whether the at least one motion picture screening facility is located within a prescribed distance of the subset of the plurality of viewers who have indicated an intent to screen the given motion picture;

when the at least one motion picture screening facility is located outside the prescribed distance, to dispatch an available mobile motion picture screening unit having a location that is closest to a given location relative to other mobile motion picture screening units in the subset of the plurality of mobile motion picture screening units, determined based on the obtained location information and status information of each of the at least a subset of the plurality of mobile motion picture screening units, wherein the given location is within the prescribed distance of said subset of the plurality of viewers; and when the notification from the at least one processor indicates that the request for screening the given motion picture has been granted, to send, via the one or more wireless networks, information for display on the mobile computing devices of said subset of the plurality of viewers indicating at least one of a date, time and location of the viewer-directed motion picture screening event for viewing the given motion picture.

\* \* \* \* \*